United States Patent [19]
Koike et al.

[11] Patent Number: 5,448,261
[45] Date of Patent: Sep. 5, 1995

[54] CURSOR CONTROL DEVICE

[75] Inventors: Masanobu Koike; Isao Tsukaune, both of Osaka; Yutaka Shimizu, Kyoto; Teruhiro Yamada, Osaka, all of Japan

[73] Assignee: Sanyo Electric Co., Ltd., Osaka, Japan

[21] Appl. No.: 74,419

[22] Filed: Jun. 10, 1993

[30]   Foreign Application Priority Data

| Jun. 12, 1992 | [JP] | Japan | 4-153665 |
| Jun. 26, 1992 | [JP] | Japan | 4-169175 |
| Jul. 17, 1992 | [JP] | Japan | 4-190711 |
| Apr. 30, 1993 | [JP] | Japan | 5-128142 |
| Apr. 30, 1993 | [JP] | Japan | 5-128143 |

[51] Int. Cl.6 ............................. G09G 5/08
[52] U.S. Cl. ..................... 345/158; 345/156; 348/734
[58] Field of Search .......... 345/158, 157, 156, 163, 345/166, 169, 179; 358/194.1; 359/142, 143, 145, 146, 148

[56]   References Cited

U.S. PATENT DOCUMENTS

| 4,559,721 | 9/1980 | Micic et al. | 345/158 |
| 4,565,999 | 1/1986 | King et al. | 345/158 |
| 4,754,268 | 6/1988 | Mori | 345/158 |
| 4,796,019 | 1/1989 | Auerbach | 345/158 |
| 5,009,501 | 4/1991 | Fenner et al. | 356/152 |
| 5,045,843 | 9/1991 | Hansen | 358/194.1 |
| 5,146,210 | 9/1992 | Heberle | 358/194.6 |

Primary Examiner—Howard W. Britton
Assistant Examiner—Doon Chow
Attorney, Agent, or Firm—Nikaido, Marmelstein, Murray & Oram

[57]   ABSTRACT

The present invention relates to a cursor control device for controlling the display position of a cursor displayed on a display device. The cursor displayed on the display device is remotely controlled by a remote control transmitter. The remote control transmitter is provided with, for example, a light emitting element emitting light rays having a particular wavelength, for example, infrared rays. The position of the remote control transmitter is detected by an imaging device including a CCD. The position of the cursor on a display screen of the display device is controlled on the basis of the detected position of the remote control transmitter.

6 Claims, 25 Drawing Sheets

FIG.25
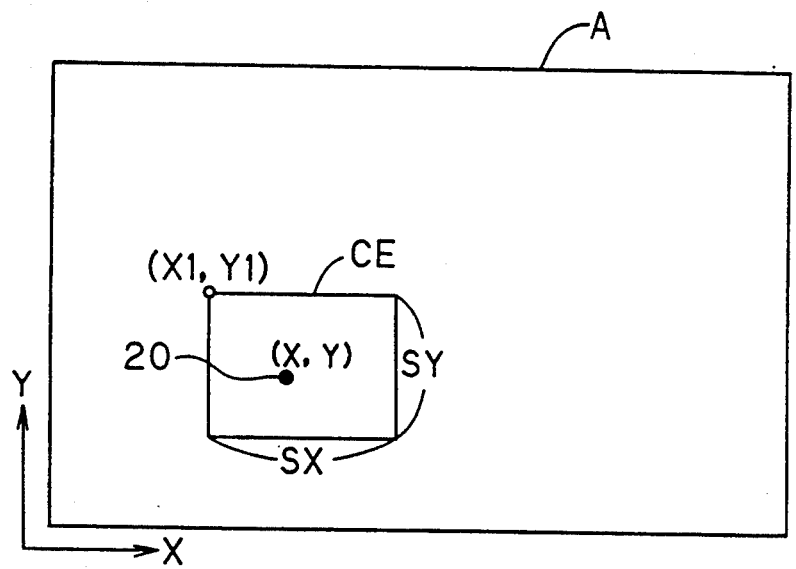
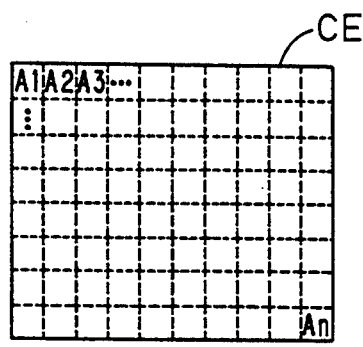
FIG.26(a)
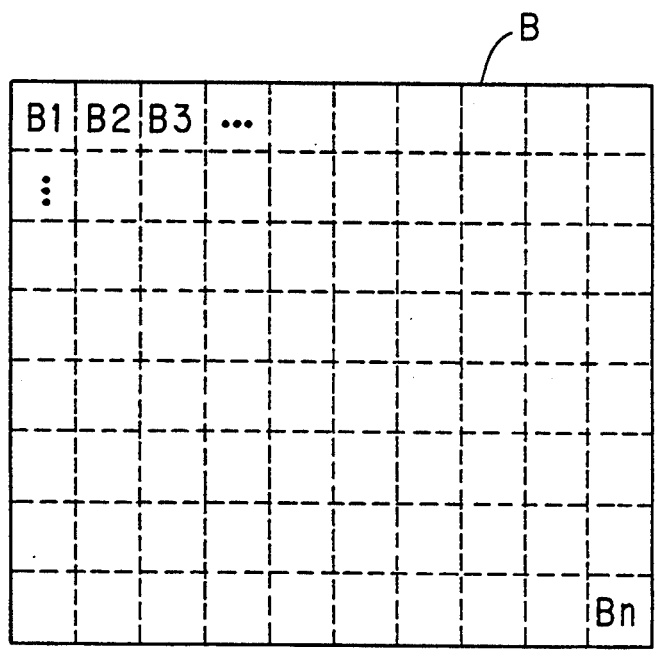
FIG.26(b)

FIG. 27

| DATA REPRESENTING BLOCKS A1~An | | CURSOR COORDINATES |
|---|---|---|
| COORDINATES IN UPPER LEFT END | COORDINATES IN LOWER RIGHT END | |
| (a1, b1) | (c1, d1) | (x1, y1) |
| (a2, b2) | (c2, d2) | (x2, y2) |
| (a3, b3) | (c3, d3) | (x3, y3) |
| ⋮ | ⋮ | ⋮ |

CURSOR CONTROL DEVICE

BACKGROUND OF THE INVENTION

1. Field of the Invention

The present invention relates to a cursor control device for controlling a cursor displayed on a display screen of a personal computer, a television receiver or the like.

2. Description of the Prior Art

Examples of this type of cursor control device conventionally known include a device described in Japanese Patent Laid-Open Gazette No. 223913/1988. In this cursor control device, a plurality of infrared light emitting diodes radially disposed are provided in a remote control transmitter, and infrared rays out of phase are respectively transmitted from the infrared light emitting diodes. The infrared rays are received by a receiving device. The direction of the remote control transmitter relative to the receiving device is judged on the basis of the relationship among signals of the infrared light emitting diodes which are received by the receiving device, and the position of a cursor on a display screen is controlled on the basis of the judged direction of the remote control transmitter.

In the above described conventional control device, however, the plurality of infrared light emitting diodes must be provided in the remote control transmitter. Accordingly, the precision of position detection of the remote control transmitter is decreased by, for example, the variation of each of the infrared light emitting diodes, and the algorithm for position detection becomes complicated. Furthermore, the number of keys of the remote control transmitter is increased, thereby to prevent the remote control transmitter from being miniaturized.

SUMMARY OF THE INVENTION

A first object of the present invention is to provide a cursor control device capable of controlling a cursor with high precision and allowing a remote control transmitter and a receiving device to be miniaturized.

A second object of the present invention is to provide a cursor control device in which the amount of movement of a cursor relative to the amount of movement of a remote control transmitter is constant irrespective of the distance between the remote control transmitter and imaging means.

A third object of the present invention is to provide a cursor control device capable of preventing a cursor from being vibrated due to the unintentional movement of the hand of an operator.

A fourth object of the present invention is to provide a cursor control device in which an operating area of a remote control transmitter for moving a cursor on a display screen can be reduced to improve the operability.

A fifth object of the present invention is to provide a cursor control device capable of moving a cursor to the center of an icon on a menu displayed on a display screen.

A first cursor control device according to the present invention comprises a display device on which a cursor is displayed, a remote control transmitter comprising a light emitting element emitting light rays having a particular wavelength and for remotely controlling the cursor displayed on the display device, imaging means for imaging the light emitting element within a predetermined imaging area, position detecting means for detecting the position of the light emitting element on the basis of an output of the imaging means, and cursor controlling means for controlling the position of the cursor on a display screen of the display device on the basis of the position of the light emitting element which is detected by the position detecting means.

One example of the above described cursor controlling means is one finding the direction of movement and the amount of movement of the light emitting element on the basis of the position of the light emitting element which is detected by the position detecting means and controlling the direction of movement and the amount of movement of the cursor on the display screen of the display device depending on the found direction of movement and the found amount of movement of the light emitting element.

Furthermore, one example of the above described cursor controlling means is one for converting the position of the light emitting element which is detected by the position detecting means into data representing the position of the cursor on the display screen of the display device to control the position of the cursor on the display screen of the display device on the basis of the data representing the position of the cursor which is found by the conversion.

A second cursor control device according to the present invention comprises a display device on which a cursor is displayed, a remote control transmitter comprising a light emitting element emitting light rays having a particular wavelength and for remotely controlling the cursor displayed on the display device, imaging means for imaging the light emitting element within a predetermined imaging area, position detecting means for detecting the position of the light emitting element on the basis of an output of the imaging means, cursor control signal generating means for generating a cursor control signal on the basis of the position of the light emitting element which is detected by the position detecting means, cursor controlling means for controlling the position of the cursor on a display screen of the display device on the basis of the cursor control signal, judging means for judging whether or not the position of the light emitting element varies due to the unintentional movement of the hand or due to the operation of the remote control transmitter, and means for inhibiting the cursor on the display screen of the display device from being moved when it is judged that the position of the light emitting element varies due to the unintentional movement of the hand.

One example of the above described cursor control signal generating means is one for finding the direction of movement and the amount of movement of the light emitting element on the basis of the position of the light emitting element which is detected by the position detecting means and finding the direction of movement and the amount of movement of the cursor on the display screen of the display device from the found direction of movement and the found amount of movement of the light emitting element.

One example of the above described cursor control signal generating means is one for converting the position of the light emitting element which is detected by the position detecting means into the position of the cursor on the display screen of the display device.

A third cursor control device according to the present invention comprises a display device on which a cursor is displayed, a remote control transmitter comprising a light emitting element emitting light rays having a particular wavelength, an operation key for generating an operation signal and means for modulating the light rays by the operation signal and for remotely controlling the cursor displayed on the display device, imaging means for imaging the light emitting element within a predetermined imaging area, position detecting means for detecting the position of the light emitting element on the basis of an output of the imaging means, cursor controlling means for controlling the position of the cursor on a display screen of the display device on the basis of the position of the light emitting element which is detected by the position detecting means, and means for generating an on-off judging signal of the operation key by demodulating the output of the imaging means.

A fourth cursor control device according to the present invention comprises a display device on which a cursor is displayed, a remote control transmitter comprising a light emitting element emitting light rays having a particular wavelength and for remotely controlling the cursor displayed on the display device, imaging means for imaging the light emitting element within a predetermined imaging area, distance detecting means for detecting the distance between the light emitting element and the imaging means, position detecting means for detecting the position of the light emitting element on the basis of an output of the imaging means, cursor controlling means for finding the amount of movement and the direction of movement of the light emitting element on the basis of the position of the light emitting element which is detected by the position detecting means, finding the amount of movement of the cursor by multiplying the amount of movement of the light emitting element by a coefficient, and finding the direction of movement of the cursor on the basis of the direction of movement of the light emitting element, to control the position of the cursor on a display screen of the display device on the basis of the found amount of movement of the cursor and the found direction of movement of the cursor, and coefficient controlling means for controlling the coefficient used for calculating the amount of movement of the cursor by the cursor controlling means on the basis of the distance detected by the distance detection means.

One example of the above described distance detecting means is one finding the distance between the light emitting element and the imaging means on the basis of the output of the imaging means using a predetermined relationship between the amount of the light from the light emitting element which is received by the imaging means and the distance between the light emitting element and the imaging means.

A fifth cursor control device according to the present invention comprises a display device on which a cursor is displayed, a remote control transmitter comprising a light emitting element emitting light rays having a particular wavelength, an operation key for generating an operation signal and means for modulating the light rays by the operation signal and for remotely controlling the cursor displayed on the display device, imaging means for imaging the light emitting element within a predetermined imaging area, distance detecting means for detecting the distance between the light emitting element and the imaging means, position detecting means for detecting the position of the light emitting element on the basis of an output of the imaging means, cursor controlling means for finding the amount of movement and the direction of movement of the light emitting element on the basis of the position of the light emitting element which is detected by the position detecting means, finding the amount of movement of the cursor by multiplying the amount of movement of the light emitting element by a coefficient, and finding the direction of movement of the cursor on the basis of the direction of movement of the light emitting element, to control the position of the cursor on a display screen of the display device on the basis of the found amount of movement of the cursor and the found direction of movement of the cursor, coefficient controlling means for controlling the coefficient used for calculating the amount of movement of the cursor by the cursor controlling means on the basis of the distance detected by the distance detecting means, and means for outputting an on-off judging signal of the operation key by demodulating the output of the imaging means.

A sixth cursor control device according to the present invention comprises a display device on which a cursor is displayed, a remote control transmitter comprising a light emitting element emitting light rays having a particular wavelength, an operation key and means for changing the intensity of the light outputted from the light emitting element in two stages in response to an on-off judging signal of the operation key and for remotely controlling the cursor displayed on the display device, imaging means for imaging the light emitting element within a predetermined imaging area, distance detecting means for detecting the distance between the light emitting element and the imaging means, position detecting means for detecting the position of the light emitting element on the basis of an output of the imaging means, cursor controlling means for finding the amount of movement and the direction of movement of the light emitting element on the basis of the position of the light emitting element which is detected by the position detecting means, finding the amount of movement of the cursor by multiplying the amount of movement of the light emitting element by a coefficient, and finding the direction of movement of the cursor on the basis of the direction of movement of the light emitting element, to control the position of the cursor on a display screen of the display device on the basis of the found amount of movement of the cursor and the found direction of movement of the cursor, coefficient controlling means for controlling the coefficient used for calculating the amount of movement of the cursor by the cursor controlling means on the basis of the distance detected by the distance detecting means, and means for outputting the on-off judging signal of the operation key on the basis of the output of the imaging means.

A seventh cursor control device according to the present invention comprises a display device on which a cursor is displayed, a remote control transmitter comprising a light emitting element emitting light rays having a particular wavelength and for remotely controlling the cursor displayed on the display device, imaging means for imaging the light emitting element within a predetermined imaging area, first storing means for storing data concerning the position and the size of a predetermined control area set in an imaging area of the imaging means to correspond to a display area of the cursor on a display screen of the display device, position detecting means for detecting the position of the light emitting element on the basis of an output of the imaging means, first converting means for converting the relative position of the light emitting element within the control area into the position of the cursor on the display screen of the display device on the basis of the position of the light emitting element which is detected by the position detecting means and the data concerning the position and the size of the control area which is stored in the first storing means, and cursor controlling means for controlling the position of the cursor on the display screen of the display device on the basis of the position of the cursor which is found by the first converting means.

It is preferable that there is provided means for altering the data concerning the position of the control area which is stored in the first storing means so that when the position of the light emitting element which is detected by the position detecting means is out of the control area, a new control area including the position of the light emitting element at that time is set.

Furthermore, it is preferable that there is provided means for altering the data concerning the position of the control area which is stored in the first storing means so that when the power supply of the remote control transmitter is turned on, a new control area centered around the position of the light emitting element which is detected by the position detecting means at that time is set.

Additionally, it is preferable that the remote control transmitter is provided with means for generating a reset signal for resetting the position of the control area by the operation of an operator, and there is provided means for altering the data concerning the position of the control area which is stored in the first storing means so that when the reset signal is generated, a new control area centered around the position of the light emitting element which is detected by the position detecting means at that time is set.

Moreover, it is preferable that there is provided means for altering the data concerning the size of the control area which is stored in the first storing means depending on the change of the display area of the cursor.

An eighth cursor control device according to the present invention comprises a display device on which a cursor is displayed, a remote control transmitter comprising a light emitting element emitting light rays having a particular wavelength and for remotely controlling the cursor displayed on the display device, imaging means for imaging the light emitting element within a predetermined imaging area, second storing means for storing the set display position of the cursor on a display screen of the display device to correspond to each of a plurality of small areas set in the imaging area of the imaging means in relation to data concerning the small area, position detecting means for detecting the position of the light emitting element on the basis of an output of the imaging means, second converting means for converting the position of the light emitting element which is detected by the position detecting means into the display position of the cursor corresponding to the small area including the position of the light emitting element on the basis of data concerning the display position of the cursor corresponding to the small area which is stored in the second storing means, and cursor controlling means for controlling the position of the cursor on the display screen of the display device on the basis of the display position of the cursor which is found by the second converting means.

It is preferable that the above described display position of the cursor is so set that the center of an icon on a menu displayed on the display device is in the display position of the cursor.

Furthermore, it is preferable that there is provided means for rewriting the data concerning the display position of the cursor corresponding to the small area which is stored in the second storing means so that the center of the icon on the menu is in the position of the cursor in conformity with the menu displayed on the display device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 25 is a schematic diagram showing a control area CE set in an imaging area A;

FIG. 26(a-b) is a schematic diagram showing a plurality of blocks set in a display screen B of a display device and a plurality of blocks set in a control area CE;

FIG. 27 is a schematic diagram showing the contents of a table 113 shown in FIG. 24;

DESCRIPTION OF THE PREFERRED EMBODIMENTS

Description is now made of embodiments with reference to the drawings.

Referring to FIGS. 1 to 11, a first embodiment of the present invention will be described.

Figure 1:
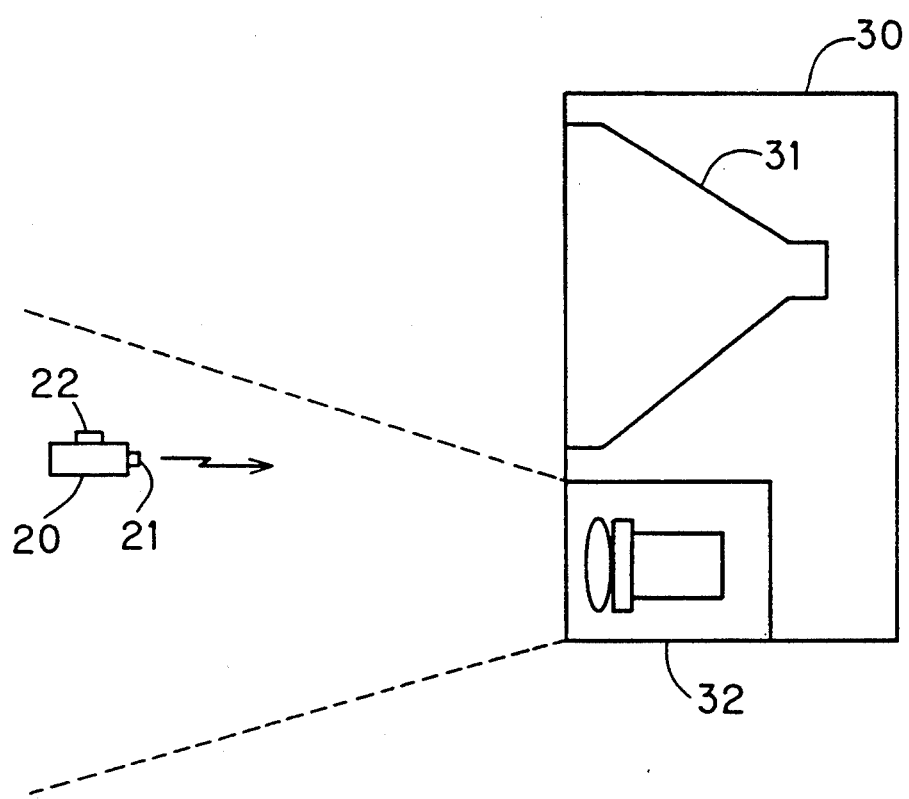
FIG. 1 is a diagram showing the schematic construction of a remote control transmitter and a television receiver.

FIG. 1 illustrates a television receiver and a remote control transmitter for giving an operation command to the television receiver.

A remote control transmitter 20 comprises a single infrared light emitting diode (infrared LED) 21 emitting infrared rays having wide directionality, a single operation key 22, and a power switch (not shown).

A television receiver 30 comprises a display device 31 such as a cathode ray tube (CRT), an imaging device 32 for imaging infrared rays from the remote control transmitter 20, a receiving device for generating a cursor control signal on the basis of an imaging output of the imaging device 32, and the like.

Figure 2:
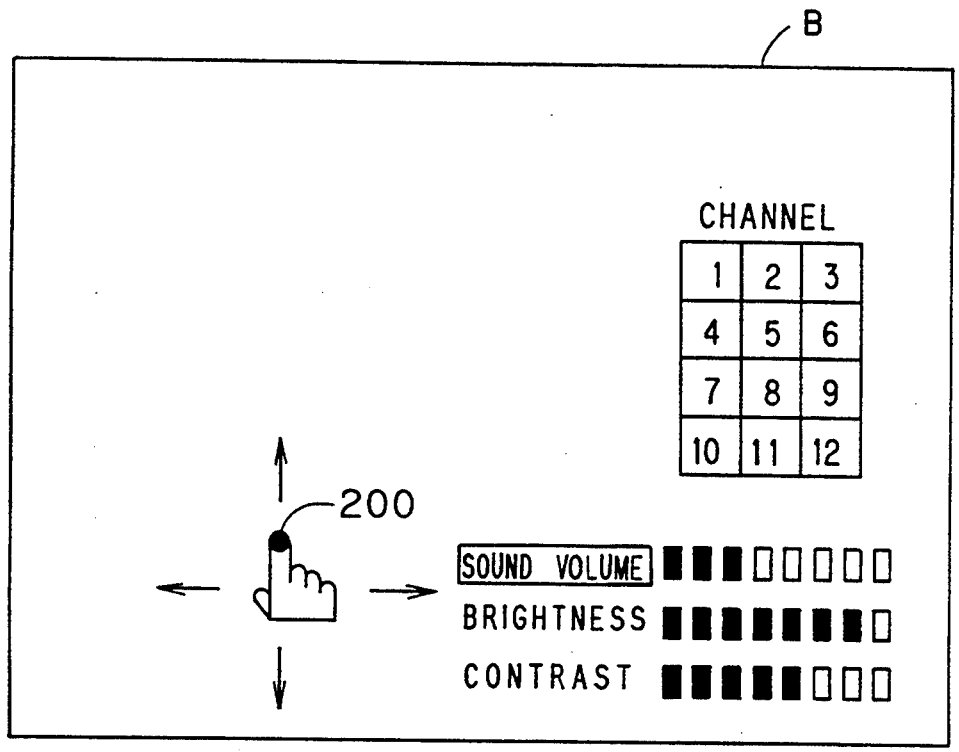
FIG. 2 is a schematic diagram showing an example of an image displayed on a display screen of a television receiver.

The imaging device 32 comprises a CCD (Charge Coupled Device) 1 (see FIG. 4), an imaging lens, and a filter for cutting visible light rays. Functional indexes of a channel, sound volume, brightness, contrast and the like and a cursor 200 are displayed on a display screen B of the display device 31, as shown in FIG. 2.

If the remote control transmitter 20 is directed toward the display screen B, the imaging device 32 is irradiated by the infrared rays having wide directionality which are emitted from the infrared light emitting diode 21. The CCD 1 in the imaging device 32 has a function capable of imaging an object in an imaging area. Since the visible light rays are cut by a filter in the imaging device 32, however, only the infrared rays are received by the CCD 1.

Figure 3:
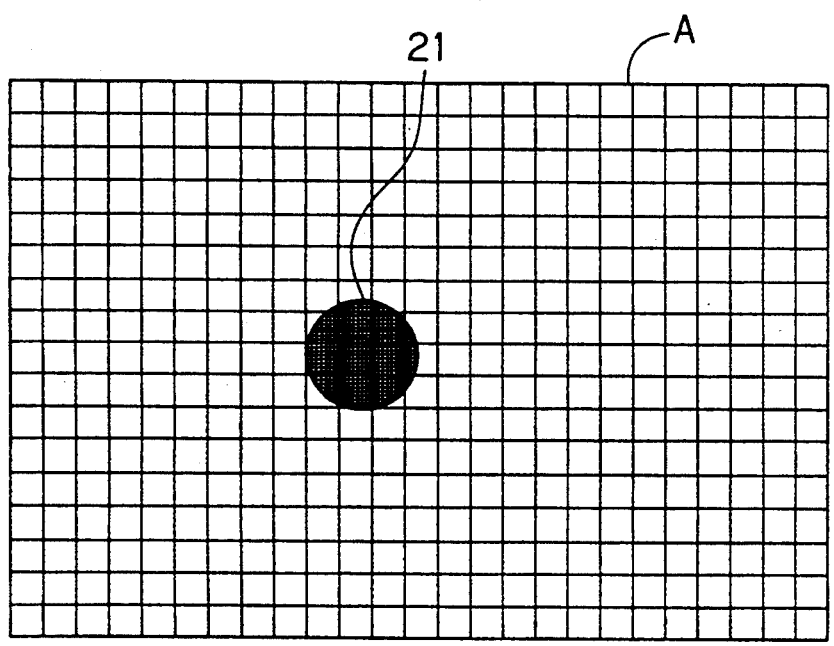
FIG. 3 is a schematic diagram showing an image of an infrared light emitting diode in a remote control transmitter which is imaged by an imaging device.

More specifically, only an image of the infrared light emitting diode 21 appears on an imaging area A, as shown in FIG. 3. Consequently, the position where an image of the remote control transmitter 20 exists in the imaging area A is detected on the basis of an output of the CCD 1. The cursor 200 is moved on the display screen B depending on the detected position of the remote control transmitter 20.

Consequently, if an operator moves the remote control transmitter 20, the cursor 200 can be moved on the display screen B as if he operates a mouse. In addition, if the cursor 200 is stopped in the position of a desired functional index to operate the operation key 22, a desired function is performed. For example, when it is desired to select a channel, the cursor 200 may be moved on a desired channel number to click the operation key 22 on the display screen B shown in FIG. 2.

Furthermore, when it is desired to increase the sound volume, the cursor 200 is first moved to the position of the functional index of the sound volume to click the operation key 22. Consequently, a character "sound volume" is enclosed by a square or displayed in an inverted manner, to indicate that a sound volume adjusting function is currently selected. If the cursor 200 is aligned with the left end of the scale of the sound volume and is moved from the left to the right with the operation key 22 being depressed, the scale division is increased and the sound volume is increased. If the depression of the operation key 22 is released when the desired sound volume is attained, the scale division and the sound volume are fixed.

Figure 4:
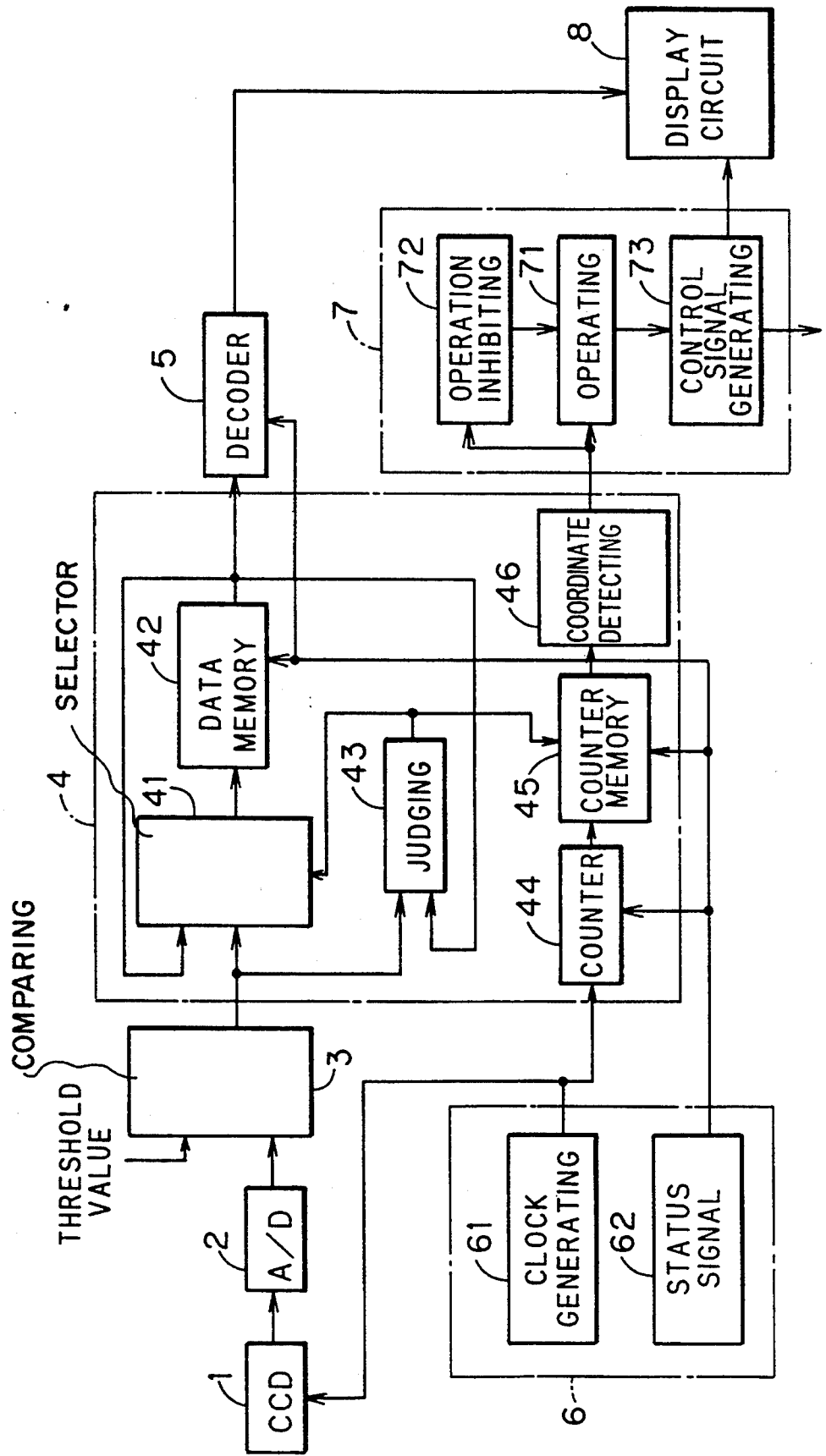
FIG. 4 is an electrical block diagram showing the schematic construction of a receiving device provided in a television receiver.

FIG. 4 shows the schematic construction of a receiving device provided in the television receiver.

Pixel data are sequentially sent to an analog-to-digital converter 2 from the CCD 1 in synchronism with clocks outputted from a clock generating circuit 61 in a timing circuit 6. The pixel data sent to the analog-to-digital converter 2 is converted into digital data by the analog-to-digital converter 2.

The digital data outputted from the analog-to-digital converter 2 is compared with a predetermined threshold value in a comparing circuit 3. When the inputted digital data is not less than a threshold value, the inputted digital data is directly outputted from the comparing circuit 3. On the other hand, when the inputted digital data is less than the threshold value, a digital signal "0" is outputted from the comparing circuit 3. Specifically, the pixel data whose luminance is less than a predetermined level is regarded as not infrared rays from the remote control transmitter 20 but noise, so that a malfunction is prevented from occurring due to the noise.

An output of the comparing circuit 3 is inputted to a maximum value detecting circuit 4. The maximum value detecting circuit 4 comprises a selector 41, a data memory 42, a judging circuit 43, a counter 44, a counter memory 45, and a coordinate detecting circuit 46, and detects the position of the maximum luminance in one frame and the value thereof.

The largest pixel data out of the pixel data inputted to the maximum value detecting circuit 4 up to the present time in one frame is stored in the data memory 42. The pixel data inputted to the maximum value detecting circuit 4 from the comparing circuit 3 is sent to the judging circuit 43, to be compared with pixel data (a memory output) read out from the data memory 42. The judging circuit 43 outputs a high level judging signal if the inputted pixel data is more than the memory output, while outputting a low level judging signal if the inputted pixel data is not more than the memory output.

The selector 41 is controlled by the judging signal outputted from the judging circuit 43. Specifically, when the judging signal is at a H level, the inputted pixel data from the comparing circuit 3 is selected by the selector 41, to be supplied to the data memory 42. Consequently, the contents of the data memory 42 are updated in this case.

On the other hand, when the judging signal is at a low level, the memory output is selected by the selector 41, to be supplied to the data memory 42. Consequently, the contents of the data memory 42 are not updated in this case. Specifically, the contents of the data memory 42 are rewritten when the inputted pixel data is more than the maximum pixel data out of the pixel data so far inputted in each frame.

The timing circuit 6 comprises a clock generating circuit 61 and a status signal generating circuit 62. The clock generating circuit 61 generates clocks having a frequency corresponding to the number of pixels of the CCD 1 to control the CCD 1, and the generated clocks are supplied as clocks to the counter 44. Consequently, a counted value of the counter 44 indicates how many pixel data are read out before the pixel data currently read out from the CCD 1 corresponds to one frame.

The status signal generating circuit 62 generates a status signal which is at a high level during a vertical blanking period on the basis of a vertical synchronizing signal outputted when the reading of the pixel data corresponding to one frame from the CCD 1 is terminated.

The counter memory 45 stores, every time the high level judging signal is inputted from the judging circuit 43, a counted value K of the counter 44 at that time. The contents of the counter memory 45 are read out and supplied to the coordinate detecting circuit 46 at timing at which the status signal rises. Consequently, data indicating how many pixel data are read out before pixel data whose luminance is the largest out of pixel data corresponding to one frame is supplied from the counter memory 45 to the coordinate detecting circuit 46 for each frame. In the coordinate detecting circuit 46, coordinate data (X, Y) representing the position of the image of the remote control transmitter 20 on the imaging area A is found on the basis of the data sent from the counter memory 45.

The data memory 42, the counter 44, and the counter memory 45 are reset at timing at which the status signal falls. The position of the image of the remote control transmitter 20 on the imaging area A is thus detected for each frame.

The pixel data outputted from the data memory 42 and the status signal outputted from the status signal generating circuit 62 are inputted to a decoder 5, so that operation pulses generated when the operation key 22 in the remote control transmitter 20 is turned on are demodulated. The operation pulses and the demodulating operation of the operation pulses will be described in detail later.

The coordinate data (X, Y) representing the position of the image of the remote control transmitter 20 on the imaging area A which is obtained by the coordinate detecting circuit 46 is supplied to a cursor control circuit 7. The cursor control circuit 7 comprises an operating portion 71, an operation inhibiting portion 72, and a control signal generating portion 73.

The amounts of change ($\Delta X$, $\Delta Y$) of the coordinates (X, Y) of the position of the image of the remote control transmitter 20 on the imaging area A which is obtained for each frame are found in the operating portion 71. Specifically, in the operating portion 71, coordinates of the position of the image of the remote control transmitter 20 in a frame one frame previous of the present frame are subtracted from the coordinates of the position of the image of the remote control transmitter 20 in the present frame, thereby to find the amounts of change ($\Delta X$, $\Delta Y$) of the coordinates (X, Y). Specifically, the amount of movement and the direction of movement of the image of the remote control transmitter 20 on the imaging area A are found.

An output of the operating portion 71 is supplied to the control signal generating portion 73. In the control signal generating portion 73, the amount of movement of the image of the remote control transmitter 20 on the imaging area A is multiplied by a predetermined coefficient, thereby to determine the amount of movement of the cursor 200 on the display screen B of the display device 31. In addition, a sign of the coordinate in the horizontal direction is inverted so as to make the direction of movement of the image of the remote control transmitter 20 on the imaging area A equal to the actual direction of movement of the remote control transmitter 20. Consequently, the direction of movement and the amount of movement of the image of the remote control transmitter 20 on the imaging area A are converted into the direction of movement and the amount of movement of the cursor 200 on the display screen B of the display device 31.

The direction of movement and the amount of movement of the cursor 200 on the display screen B of the display device 31 which are found by the control signal generating portion 73 are outputted as a cursor control signal from the control signal generating portion 73. The cursor control signal from the control signal generating portion 73 and the operation pulses from the decoder 5 are supplied to a display circuit 8. The display circuit 8 controls the position of the cursor 200 on the display screen B of the display device 31 on the basis of the cursor control signal and performs a function which has been selected by the cursor 200 when the operation key 22 is depressed on the basis of the operation pulses.

Figure 5:
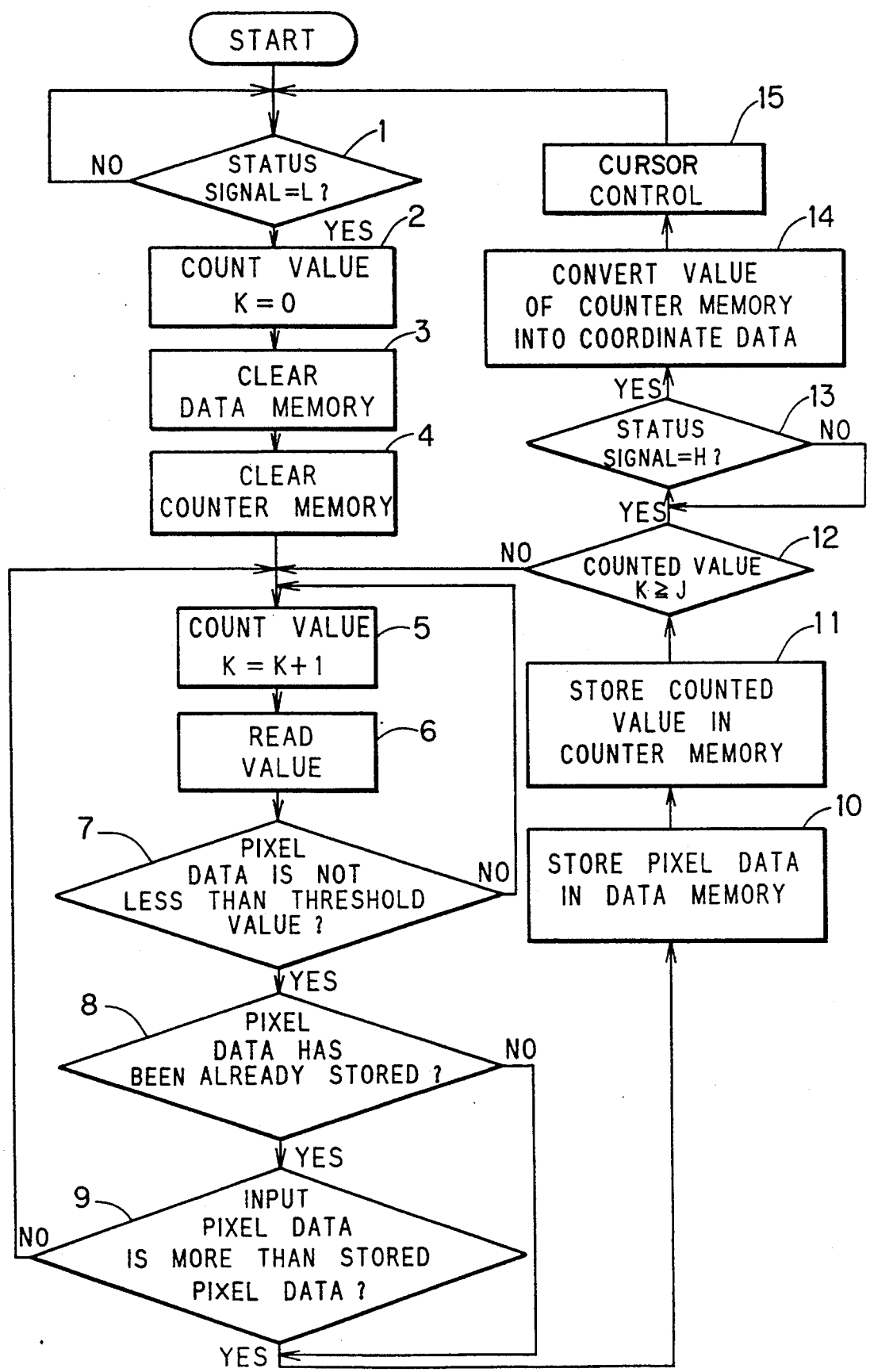
FIG. 5 is a flow chart showing the flow of processing performed by a receiving device.

FIG. 5 is a flow chart schematically showing the flow of processing performed by the above described receiving device. The flow of the processing performed by the receiving device will be described simply on the basis of FIG. 5.

When the status signal attains a low level (step 1), the counted value K of the counter 44 is made zero, and the data memory 42 and the counter memory 45 are cleared (steps 2 to 4).

Thereafter, the counted value K of the counter 44 is incremented by one on the basis of the clocks outputted from the clock generating circuit 61 (step 5), and the pixel data is read out from the CCD 1 (step 6), to be converted into the digital data by the analog-to-digital converter 2. Thereafter, it is judged whether or not the inputted pixel data is not less than a predetermined threshold value in the comparing circuit 3 (step 7).

When the inputted pixel data is not less than the predetermined threshold value, and pixel data has been already stored in the data memory 42 (step 8), the judging circuit 43 judges whether or not the inputted pixel data is more than the pixel data stored in the data memory 42 (step 9).

When the inputted pixel data is less than the predetermined threshold value (NO in step 7), and when it is judged that the inputted pixel data is not more than the pixel data stored in the data memory 42 (NO in step 9), the program is returned to the step 5 at timing at which the succeeding pixel data is read out.

When no pixel data is stored in the data memory 42 (NO in step 8), or when it is judged that the inputted pixel data is more than the pixel data stored in the data memory 42 (YES in step 9), the inputted pixel data is stored in the data memory 42 (step 10), and the counted value K of the counter 44 is stored in the counter memory 45 (step 11). When the counted value K of the counter 44 is less than the number of pixels J to be read out by scanning of one frame (step 12), the program is returned to the step 5 at timing at which the succeeding pixel data is read out.

When the counted value K of the counter 44 reaches the number of pixels J to be read out by scanning of one frame in the step 12, the program proceeds to the step 13, to wait until the status signal attains a high level. When the status signal attains a high level, the contents of the counter memory 45 are sent to the coordinate detecting circuit 46, to be converted into coordinate data on the imaging area A (step 14). Thereafter, cursor control is carried out on the basis of the coordinate data (step 15). In addition, the program is returned to the step 1, to wait until the status signal attains a low level. When the status signal attains a low level, processing with respect to the succeeding frame is started.

Figure 6:
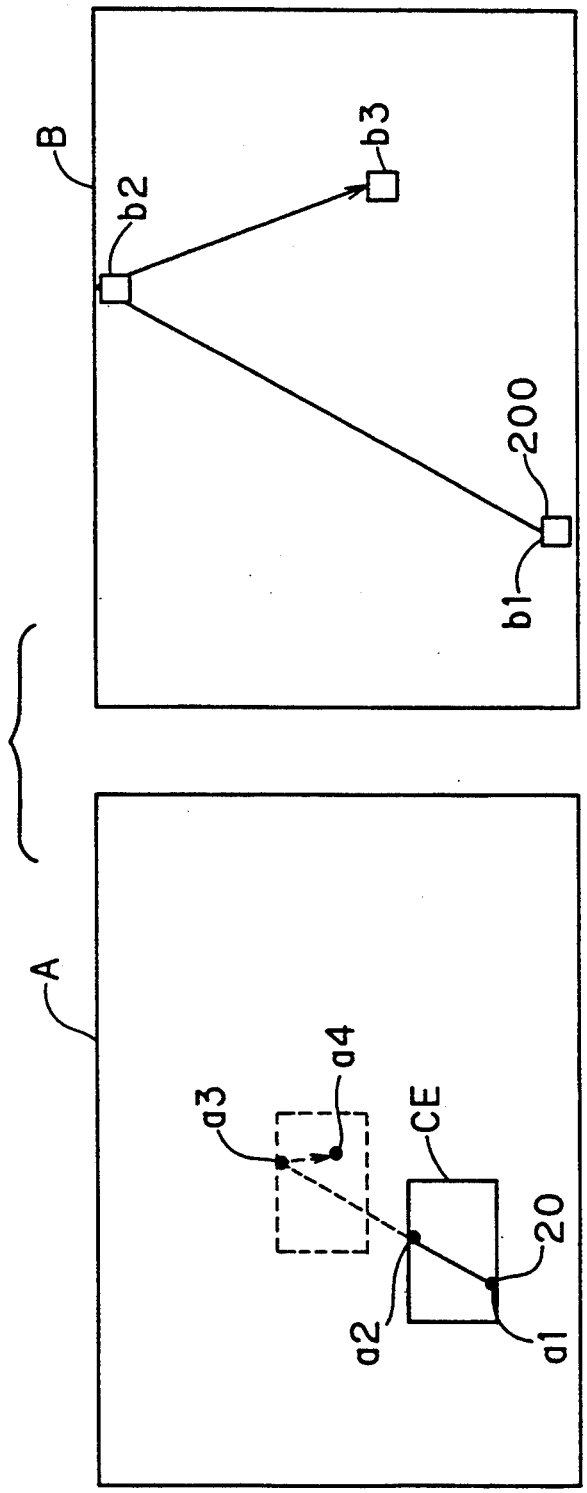
FIG. 6 is a schematic diagram showing a control area CE set in an imaging area A and a display screen B of a display device 31.

FIG. 6 illustrates the relationship between the movement of the remote control transmitter 20 within the imaging area A and the movement of the cursor 200 on the display screen B of the display device 31.

Such an area in the imaging area A that the cursor 200 can be moved over the whole display screen B by moving the remote control transmitter 20 within the area shall be a control area CE. This control area CE is set to be smaller than the imaging area A, and is movable within the imaging area A.

When the remote control transmitter 20 is moved within the control area CE, the control area CE is not moved. When the remote control transmitter 20 is raised from a lower end to an upper end of the control area CE, as indicated by a line a1-a2 in FIG. 6, the cursor 200 stops in a position in an upper end of the display screen B, as indicated by a line b1-b2 in FIG. 6. Thereafter, as the remote control transmitter 20 is further raised as indicated by a line a2-a3, the control area CE is raised as indicated by a broken line. The reason for this is that a cursor control signal represents not the absolute position of the remote control transmitter 20 but the amount of movement thereof. Therefore, as the remote control transmitter 20 is then lowered as indicated by a line a3-a4, the cursor 200 is lowered as indicated by a line b2-b3.

Furthermore, if the remote control transmitter 20 goes out of the imaging area A, the cursor 200 stops in the position of the cursor 200 at the time point where the remote control transmitter 20 goes out of the imaging area A. Thereafter, if the remote control transmitter 20 enters the imaging area A again in a different position from the position where it goes out of the imaging area A, a new control area CE is formed on the basis of the position where the remote control transmitter 20 enters the imaging area A, so that the cursor 200 starts to be moved in the position where it stands still.

If an attempt to lower the cursor 200 is made by raising the remote control transmitter 20 from a position a2 below the imaging area A to a position a2 within the imaging area A and then, lowering the remote control transmitter 20 with the cursor 200 standing still in a position in an upper end b1 of the display screen B, however, the following inconvenience occurs.

Specifically, if the remote control transmitter 20 is raised until it enters the imaging area A, a new control area CE is formed. In a case where the remote control transmitter 20 is not sufficiently raised, however, if the remote control transmitter 20 is lowered from the position a2, the remote control transmitter 20 reaches a position in a lowermost end a3 of the imaging area A before the cursor 200 reaches a position in a lowermost end of the display screen B, so that the cursor 200 stops in a halfway position b2 within the display screen B.

Figure 7:
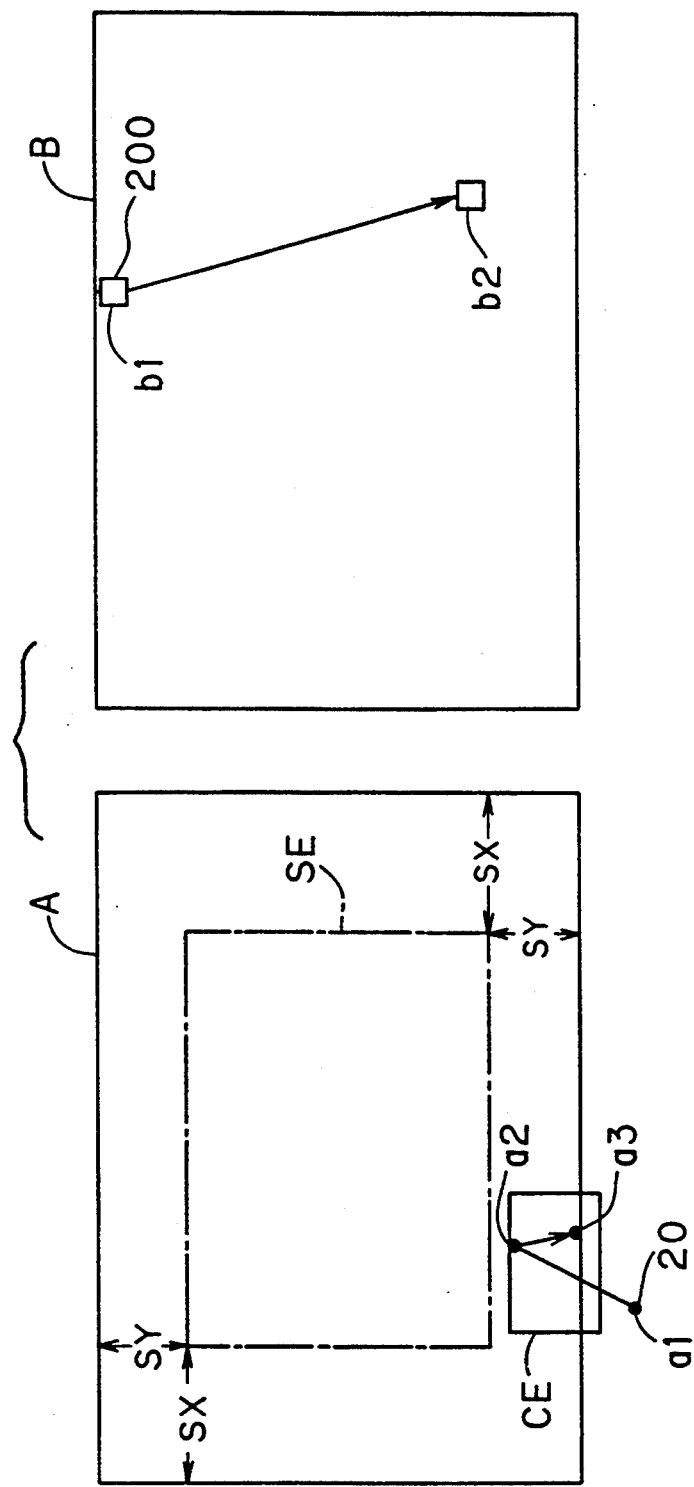
FIG. 7 is a schematic diagram showing an effective area SE set in an imaging area A and a display screen B of a display device 31.

In order to prevent such inconvenience, an area (an effective area SE) where the operating portion 71 effectively operates when the remote control transmitter 20 enters the imaging area A from the outside of the imaging area A is set within the imaging area A, as shown in FIG. 7 so that the cursor control signal is not generated until the remote control transmitter 20 reaches the effective area SE. The relationship between the effective area SE and the imaging area A is as shown in FIG. 7. In FIG. 7, SX represents the length in the horizontal direction of the control area CE of regular size, and SY represents the length in the vertical direction of the control area CE of regular size.

The operation inhibiting portion 72 is provided so as to inhibit the operation of the operating portion 71 until the remote control transmitter 20 reaches the effective area SE, that is, the control area CE of regular size is formed when the remote control transmitter 20 enters the imaging area A from the outside of the imaging area A.

Figure 8:
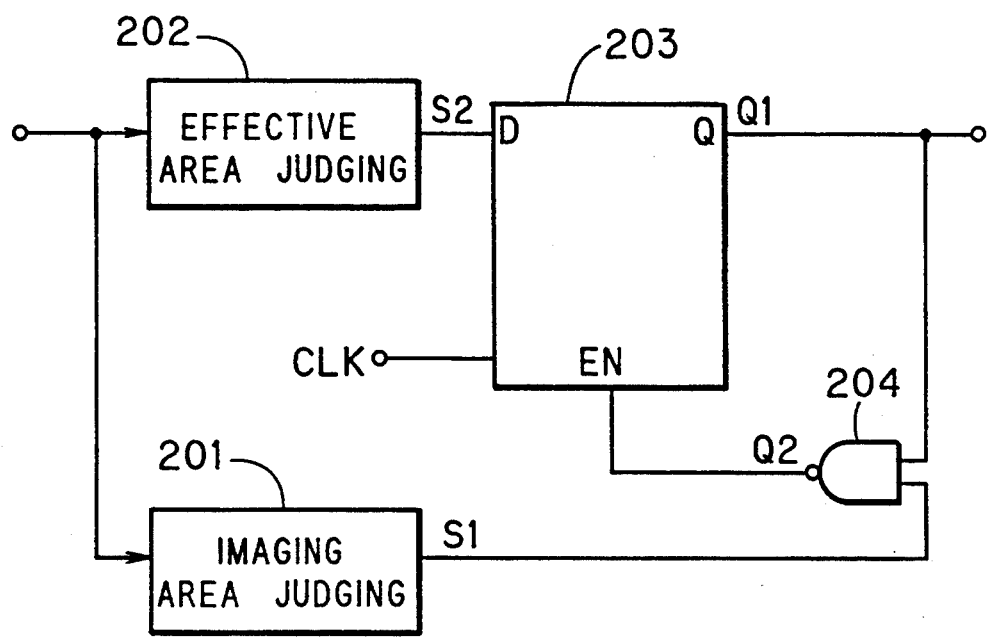
FIG. 8 is an electrical circuit diagram showing the structure of an operation inhibiting circuit 72 shown in FIG. 4.

FIG. 8 shows the detailed structure of the operation inhibiting portion 72.

The operation inhibiting portion 72 comprises an imaging area judging circuit 201, an effective area judging circuit 202, a D-type flip-flop 203, and a NAND gate 204.

The imaging area judging circuit 201 judges the presence or absence of coordinate data outputted from the coordinate detecting circuit 46, thereby to judge whether or not the remote control transmitter 20 exists in the imaging area A. The effective area judging circuit 202 compares the coordinate data outputted from the coordinate detecting circuit 46 with coordinate data corresponding to the effective area SE, thereby to judge whether or not the remote control transmitter 20 exists within the effective area SE.

The D-type flip-flop 203 reads an output S2 of the effective area judging circuit 202 which is inputted to its data input terminal D and holds the same when a signal Q2 inputted to its enable terminal EN is at a high level (when the D-type flip-flop 203 is in an enable state). The NAND gate 204 carries out the logical NAND between an output Q1 of the D-type flip-flop 203 and an output S1 of the imaging area judging circuit 201. The output Q2 of the NAND gate 204 is sent to the enable terminal EN of the D-type flip-flop 203. The operating portion 71 is brought into an operable state when the output of the D-type flip-flop 203 is at a high level, while being brought into an operation inhibited state when it is at a low level.

Figure 9:
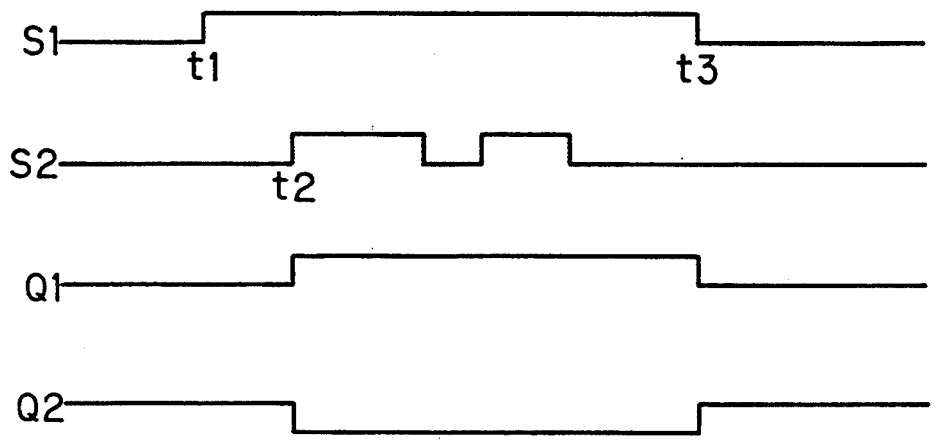
FIG. 9 is a timing chart showing signals of respective portions shown in FIG. 8.

FIG. 9 shows signals of the respective portions in the operation inhibiting portion 72.

When the remote control transmitter 20 enters the imaging area A from the outside of the imaging area A, as shown in FIG. 7 (at a time point t1), the output S1 of the imaging area judging circuit 201 is switched from a low level to a high level. Since the output Q1 of the D-type flip-flop 203 is at a low level at this time point, the output Q2 of the NAND gate 204 is at a high level, so that the D-type flip-flop 203 is in an enable state. However, the output S2 of the effective area judging circuit 202 is at a low level, so that the output Q1 of the D-type flip-flop 203 remains at a low level. Consequently, the operation of the operating portion 71 is inhibited.

When the remote control transmitter 20 then enters the effective area SE (at a time point t2), the output S2 of the effective area judging circuit 202 is switched from a low level to a high level. Consequently, the signal S2 at a high level is read in the D-type flip-flop 203, so that the output Q1 of the D-type flip-flop 203 attains a high level. Consequently, the operation inhibited state of the operating portion 71 is released.

When the output Q1 of the D-type flip-flop 203 attains a high level, the output S1 of the imaging area judging circuit 201 is at a high level, so that the output Q2 of the NAND pate 204 attains a low level. Therefore, the D-type flip-flop 203 enters a disable state. Even if the remote control transmitter 20 goes out of the effective area SE within the imaging area A so that the input signal S2 of the D-type flip-flop 203 is changed, therefore, the output Q1 of the D-type flip-flop 203 is maintained at a high level.

In a state where the D-type flip-flop 203 is in a disable state, when the remote control transmitter 20 goes out of the imaging area A (at a time point t3), the output S1 of the imaging area judging circuit 201 attains a low level, so that the output Q2 of the NAND pate 204 attains a high level. Consequently, the D-type flip-flop 203 enters an enable state again. Since the output S2 of the effective area judging circuit 202 is at a low level at this time, the signal S2 at a low level is read in the D-type flip-flop 203, so that the output Q1 of the D-type flip-flop attains a low level. Consequently, the operation of the operating portion 71 is inhibited.

More specifically, even if the remote control transmitter 20 enters the imaging area A from the outside of the imaging area A, cursor control is inhibited until the remote control transmitter 20 enters the effective area SE. If the remote control transmitter 20 enters the effective area SE once, the cursor control is carried out until the remote control transmitter 20 goes out of the imaging area A.

Figure 10:
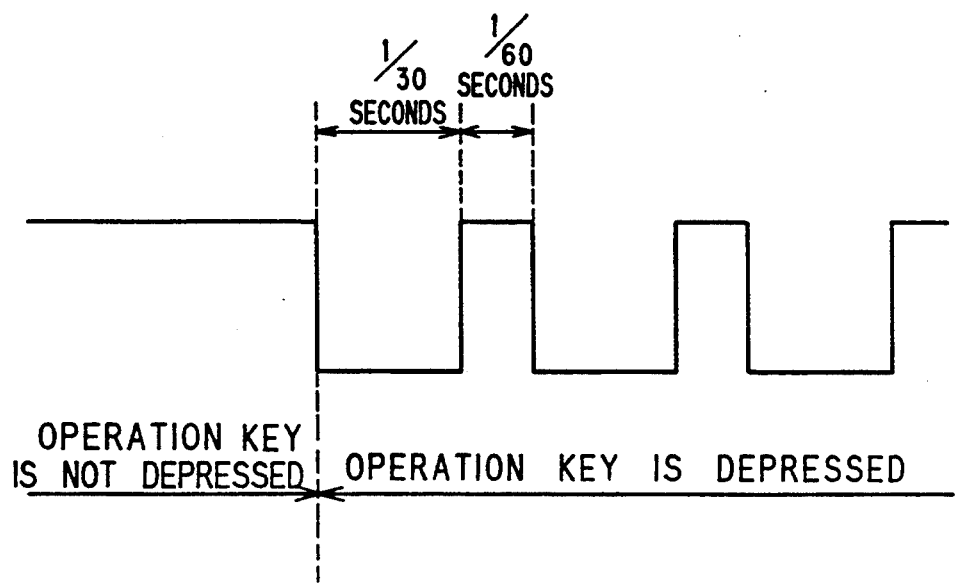
FIG. 10 is a timing chart showing a signal outputted from a remote control transmitter.

FIG. 10 shows a remote control signal outputted from the remote control transmitter 20.

Infrared rays outputted from the remote control transmitter 20 are continuously outputted as a carrier having a frequency of 38 KHZ when the operation key 22 is not depressed. If the operation key 22 is depressed, this carrier is modulated by an operation pulse which is at a high level for a period of 1/60 seconds and is at a low level for a period of 1/30 seconds and is sent out. However, pixel data corresponding to one frame are read out from the CCD 1 every 1/60 seconds.

As this operation pulse, it is also possible to use a pulse which has a period which is not equal to twice a period during which pixel data corresponding to one frame are read out and is at a low level for a period longer than the period during which pixel data corresponding to one frame are read out.

Figure 11:
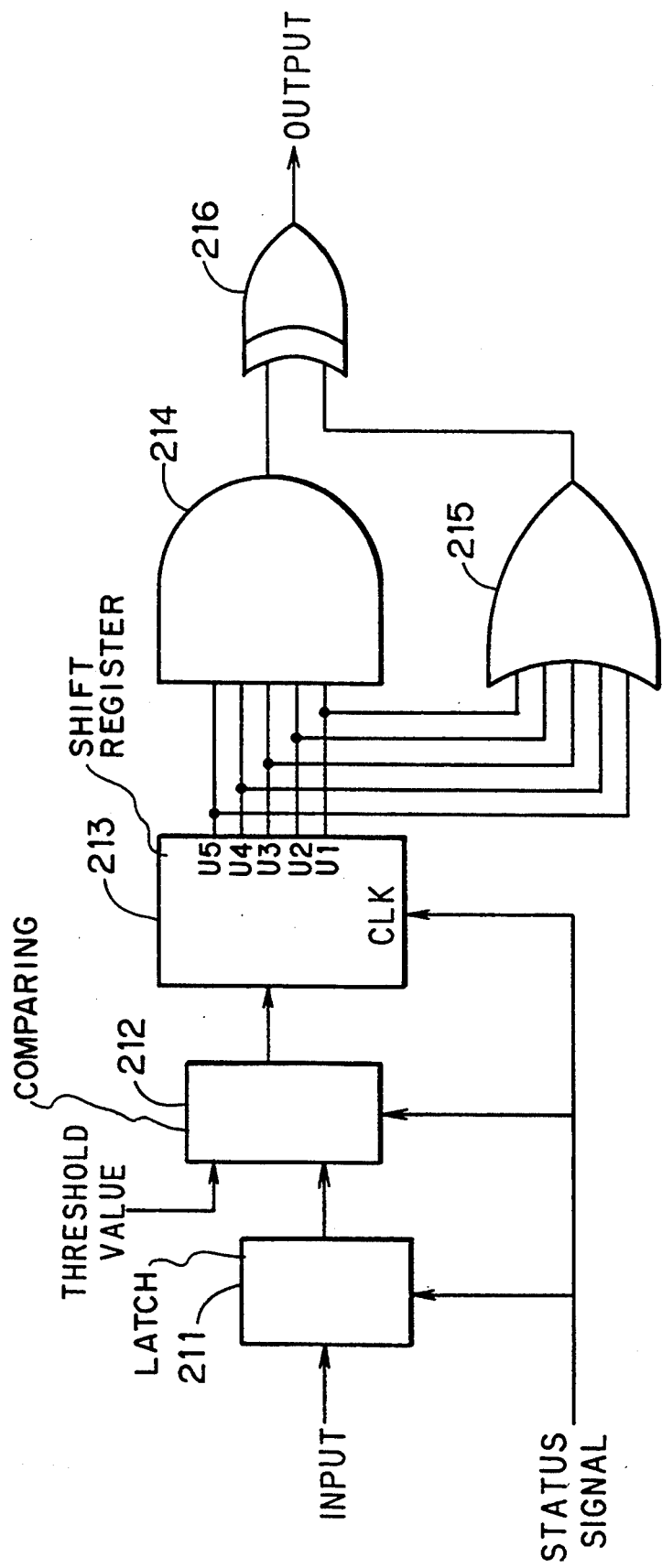
FIG. 11 is an electrical circuit diagram showing the structure of a decoder 5 shown in FIG. 4.

FIG. 11 shows the detailed structure of the decoder 5.

Pixel data outputted from the data memory 42 is latched in a latch circuit 211 at timing at which the status signal rises. Specifically, the largest data in each frame is inputted. The latched data is compared with a predetermined threshold value in a comparing circuit 212. This threshold value is set to a value at a level between a high level and a low level of the above described operation pulse. The comparing circuit 212 outputs 1-bit data "1" when the inputted pixel data is more than the threshold value, while outputting 1-bit data "0" when it is less than the threshold value. This 1-bit data is supplied to a shift register 213.

The shift register 213 performs a shifting operation utilizing as clocks the status signal, to generate parallel outputs U1 to U5. Each of the outputs U1 to U5 is supplied to an AND circuit 214 and an OR circuit 215. An output of the AND circuit 214 and an output of the OR circuit 215 are supplied to an exclusive OR circuit 216.

This decoder 5 judges the on or off state of the operation key 22 in units of five frames.

If the operation key 22 is turned off, data "1" is outputted from the comparing circuit 212 continuously over five frames, so that all the five outputs U1 to U5 of the shift register 213 attain a high level. Consequently, both the outputs of the AND circuit 214 and the OR circuit 215 attain a high level, so that an output of the exclusive OR circuit 216 attains a low level. In addition, when the remote control transmitter 20 is not within the imaging area A, all the outputs U1 to U5 attain a low level. Consequently, both the outputs of the AND circuit 214 and the OR circuit 215 attain a low level, so that the output of the exclusive OR circuit 216 similarly attains a low level.

If the remote control transmitter 20 is within the imaging area A and the operation key 22 is turned on, a carrier modulated by the operation pulse (a wave to be modulated) is received by the CCD 1. Accordingly, the continuous five frames are present as a mixture of a frame in which an output of the CCD 1 corresponding to only a portion having a small amplitude of the wave to be modulated is obtained and a frame in which an output of the CCD 1 corresponding to a portion including a portion having a large amplitude of the wave to be modulated is obtained. Consequently, the five outputs U1 to U5 of the shift register 213 are present as a mixture of high and low level outputs. Therefore, the output of the AND circuit 214 attains a low level, and the output of the OR circuit 215 attains a high level, so that the output of the exclusive OR circuit 216 attains a high level.

More specifically, the output of the decoder 5 attains a low level when the operation key 22 is not depressed, while attaining a high level when it is depressed. The output of the decoder 5 is used as a signal for controlling the operation of the television receiver as an on-off signal of the operation key 22.

Referring to FIGS. 12 to 16, a second embodiment of the present invention will be described.

In the above described first embodiment, the amount of movement of the image of the remote control transmitter 20 on the CCD 1 is multiplied by a predetermined coefficient, thereby to find the amount of movement of the cursor 200 on the display screen. When the remote control transmitter 20 is operated in two positions which differ in distance from the CCD 1 and is moved by the same distance from the two positions, therefore, the amounts of movement of the images of the remote control transmitter 20 on the CCD 1 differ from each other, so that the amount of movement of the cursor 200 on the display screen varies. Consequently, the amount of movement of the cursor 200 differs depending on the position where the remote control transmitter 20 is operated even if the remote control transmitter 20 is moved by the same amount.

Figure 12:
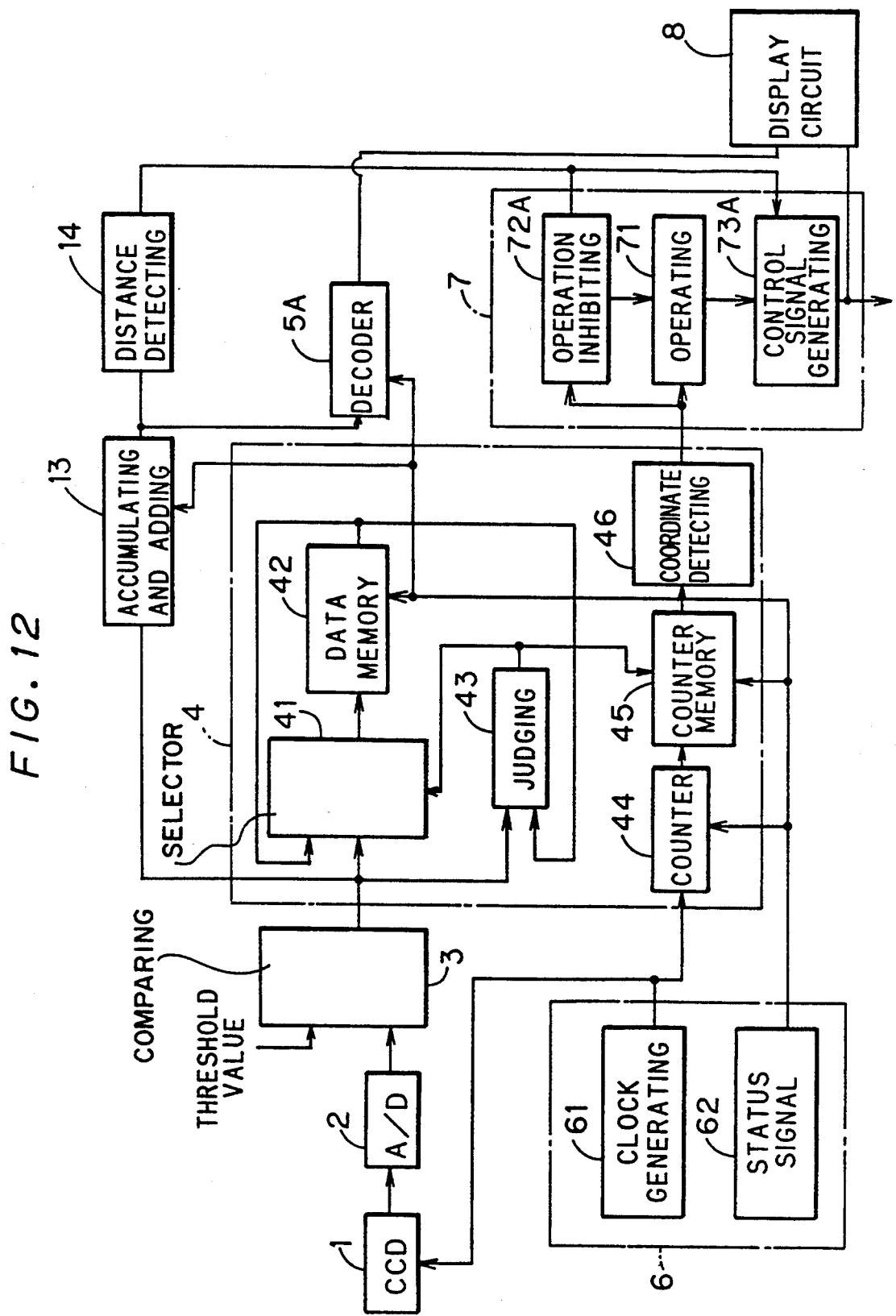
FIG. 12 is an electrical block diagram showing the schematic construction of another receiving device.

FIG. 12 shows a receiving device capable of making the amount of movement of a cursor 200 relative to the amount of movement of a remote control transmitter 20 irrespective of the distance between the remote control transmitter 20 and a CCD 1. In FIG. 12, the same portions as those shown in FIG. 4 are assigned the same reference numerals and hence, the description thereof is omitted.

In the receiving device shown in FIG. 12, an accumulating and adding circuit 13 and a distance detecting circuit 14 are added to the receiving device shown in FIG. 4. An output of the accumulating and adding circuit 13 is inputted to a decoder 5A. In addition, an output of the distance detecting circuit 14 is sent to a control signal generating portion 73A and an operation inhibiting portion 72A in a cursor control circuit 7.

In this receiving device, digital data outputted from a comparing circuit 3 is also supplied to the accumulating and adding circuit 13. The accumulating and adding circuit 13 accumulates and adds the digital data inputted. A value obtained by the accumulation and addition of the digital data by the accumulating and adding circuit 13 is outputted at timing at which a status signal rises. In addition, the accumulating and adding circuit 13 is reset at timing at which the status signal falls. Consequently, a value obtained by accumulation and addition of digital data corresponding to one frame is outputted for each frame from the accumulating and adding circuit 13. Consequently, an output of the accumulating and adding circuit 13 represents the strength of a signal outputted from an infrared light emitting diode 21 for each frame.

The output of the accumulating and adding circuit 13 is supplied to the decoder 5A and the distance detecting circuit 14. The status signal is inputted to the decoder 5A in addition to the output of the accumulating and adding circuit 13, so that operation pulses generated when an operation key 22 in the remote control transmitter 20 is turned on are demodulated. The operation pulses and the demodulating operation of the operation pulses will be described in detail later.

Figure 13:
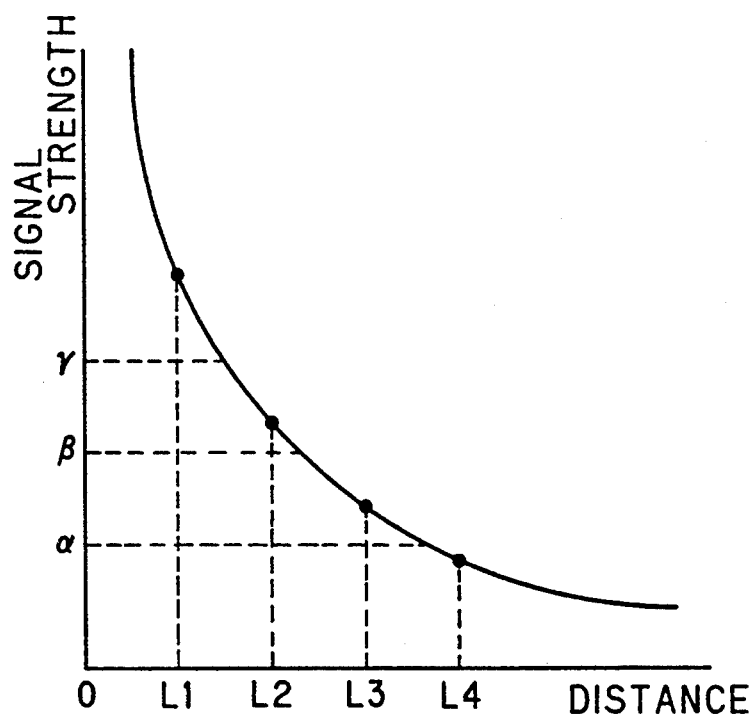
FIG. 13 is a graph showing the relationship between the signal strength and the distance.

The distance detecting circuit 14 finds the distance between the CCD 1 and the infrared light emitting diode 21 in the remote control transmitter 20 from the output of the accumulating and adding circuit 13 using the relationship between the strength of the signal outputted from the infrared light emitting diode 21 for each frame and the distance between the CCD 1 and the remote control transmitter 20 (see FIG. 13).

Figure 14:
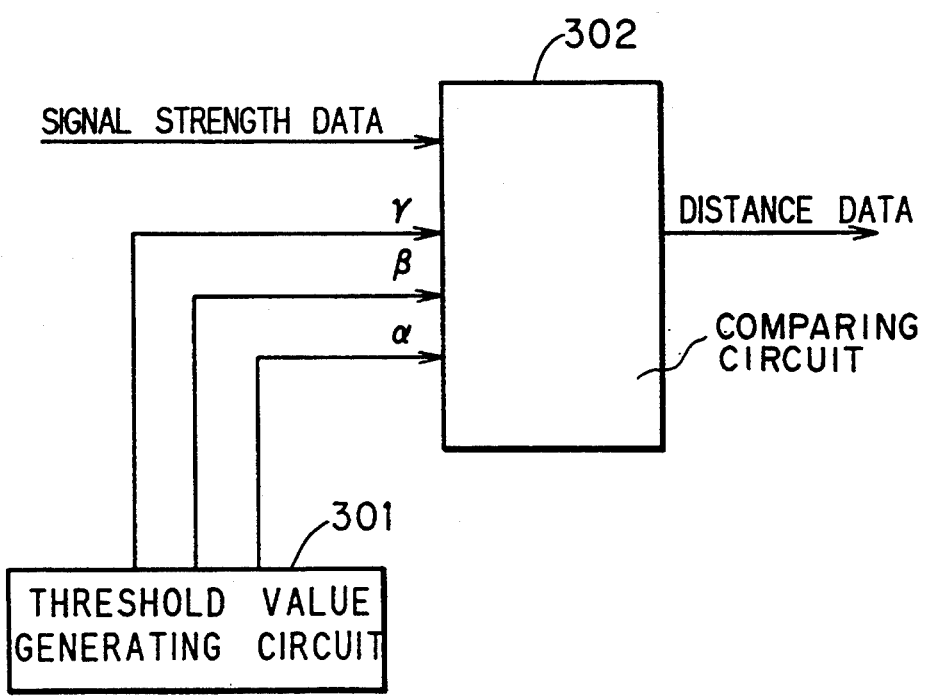
FIG. 14 is an electrical circuit diagram showing the structure of a distance detecting circuit 14 shown in FIG. 12.

FIG. 14 shows the structure of the distance detecting circuit 14. The distance detecting circuit 14 comprises a threshold value generating circuit 301 and a comparing circuit 302. Three threshold values $\alpha$, $\beta$ and $\gamma$ shown in FIG. 13 are outputted from the threshold value generating circuit 301. The comparing circuit 302 judges which of four ranges separated from each other by the threshold values corresponds to signal strength data, to select one distance data corresponding to the judged range out of four distance data L1, L2, L3 and L4 which are previously set to correspond to the respective ranges and output the same. An output of the comparing circuit 302 is supplied to the control signal generating portion 73A and the operation inhibiting portion 72A in the cursor control circuit 7.

The distance between the CCD 1 and the infrared light emitting diode 21 in the remote control transmitter 20 may be found by storing the distance data corresponding to the signal strength shown in FIG. 13 in table form to read out the distance data corresponding to the signal strength data outputted from the accumulating and adding circuit 13. In addition, the distance data corresponding to the signal strength data outputted from the accumulating and adding circuit 13 may be calculated on the basis of the graph shown in FIG. 13.

Furthermore, although in the present embodiment, the distance between the CCD 1 and the infrared light emitting diode 21 in the remote control transmitter 20 is found on the basis of the signal strength data outputted from the accumulating and adding circuit 13, the distance between the CCD 1 and the infrared light emitting diode 21 may be found on the basis of the size on the imaging area of the infrared light emitting diode 21 in the remote control transmitter 20. In addition, two infrared light emitting diodes 21 may be provided in the remote control transmitter 20 to find the distance between the CCD 1 and the infrared light emitting diode 21 on the basis of the spacing between the two infrared light emitting diodes 21 on the imaging area.

In the control signal generating portion 73A, the amount of movement of the image of the remote control transmitter 20 on the imaging area A which is found by an operating portion 71 is multiplied by a predetermined coefficient, thereby to determine the amount of movement of the cursor 200 on the display screen B of the display device 31. This control signal generating portion 73A differs from the control signal generating portion 73 shown in FIG. 4 in that the value of the above described coefficient is controlled depending on the distance data from the distance detecting circuit 14. Specifically, the coefficient is so controlled to be smaller if the distance between the CCD 1 and the infrared light emitting diode 21 is short, while being so controlled as to be larger if it is long. Consequently, the ratio of the amount of movement of the cursor 200 on the display screen B to the actual amount of movement of the remote control transmitter 20 becomes constant irrespective of the distance between the CCD 1 and the infrared light emitting diode 21.

Figure 15:
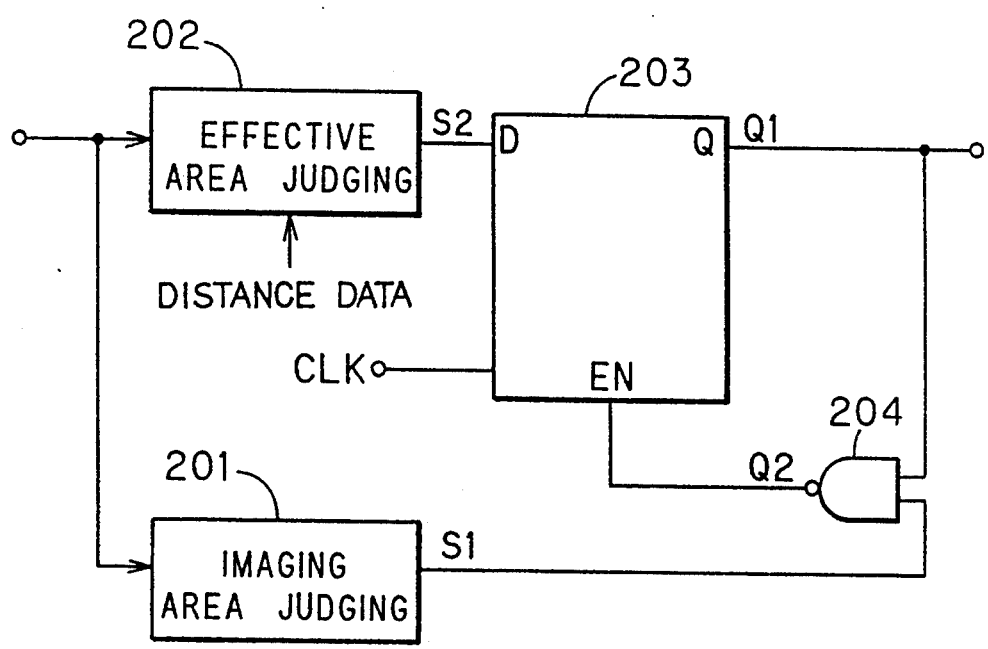
FIG. 15 is an electrical circuit diagram showing the structure of an operation inhibiting circuit 72A shown in FIG. 12.

FIG. 15 shows the detailed structure of the operation inhibiting portion 72A.

The operation inhibiting portion 72A has approximately the same structure as that of the operation inhibiting portion 72 shown in FIG. 8. This operation inhibiting portion 72A differs from the operation inhibiting portion 72 shown in FIG. 8 in that the distance data from the distance detecting circuit 14 is inputted to an effective area judging circuit 202.

The size of the control area CE described in FIG. 8 varies depending on the coefficient used in the control signal generating portion 73A. Specifically, it varies depending on the distance data outputted from the distance detecting circuit 14. In addition, the size of the effective area SE (see FIG. 9) depends on the size of the control area CE. In the operation inhibiting portion 72A, therefore, data representing the position and the size of the effective area SE used in the effective area judging circuit 202 is altered depending on the distance data from the distance detecting circuit 14.

Figure 16:
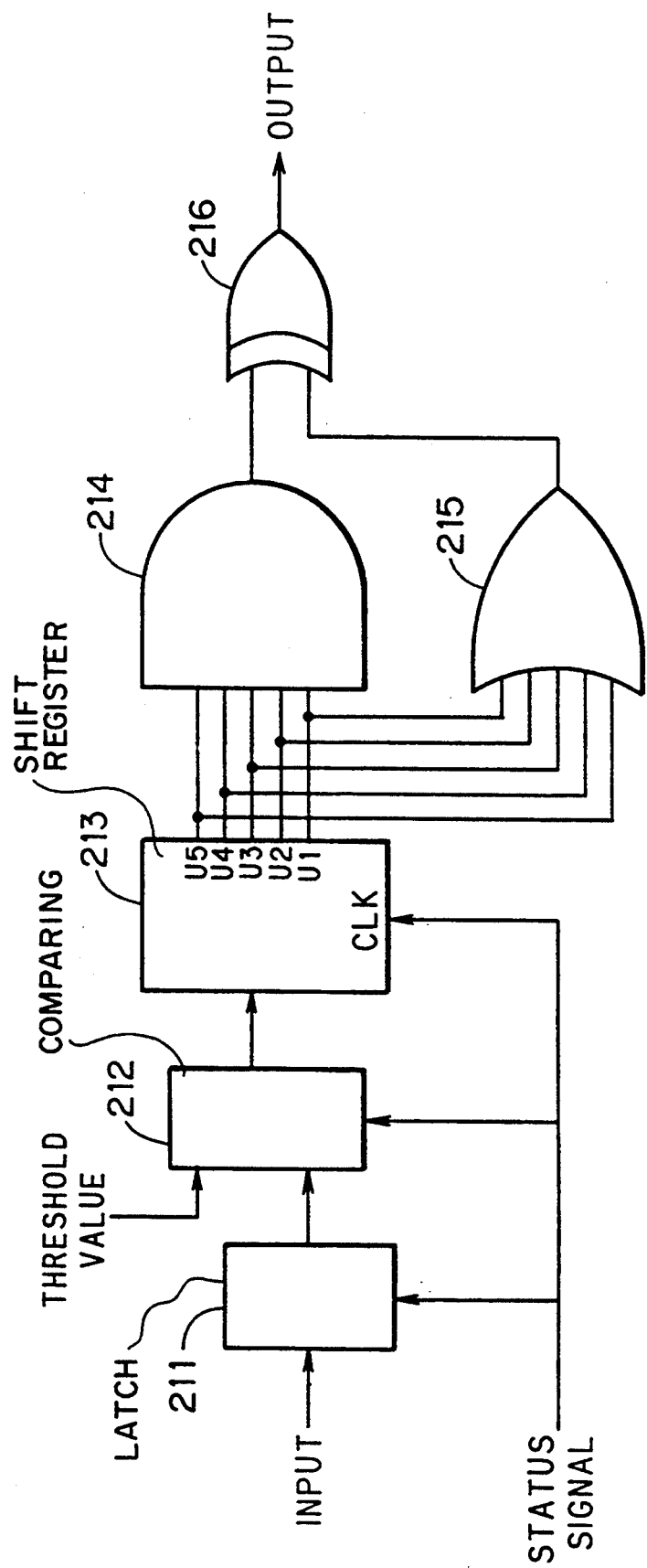
FIG. 16 is an electrical circuit diagram showing the structure of a decoder 5A shown in FIG. 12.

FIG. 16 shows the detailed structure of the decoder 5A. A remote control signal outputted from the remote control transmitter 20 is the same as the signal described in FIG. 12.

The decoder 5A differs from the decoder 5 shown in FIG. 4 in that a value obtained by accumulation and addition is inputted for each frame from the accumulating and adding circuit 13. Specifically, the data outputted from the accumulating and adding circuit 13 is latched by a latch circuit 211 at timing at which the status signal rises. Specifically, a value obtained by accumulation and addition for each frame of outputs of the comparing circuit 3 is inputted. The latched data is compared with a predetermined threshold value in a comparing circuit 212. This threshold value is set to a value between a value obtained by accumulation and addition by the accumulating and adding circuit 13 in a case where the above described operation pulse at a low level is sent and a value obtained by accumulation and addition by the accumulating and adding circuit 13 in a case where the above described carrier is sent. The comparing circuit 212 outputs 1-bit data "1" when the input data is more than the threshold value, while outputting 1-bit data "0" when it is less than the threshold value. This 1-bit data is supplied to a shift register 213.

The shift register 213 performs a shifting operation utilizing as clocks the status signal, to generate parallel outputs U1 to U5. Each of the outputs U1 to U5 is supplied to an AND circuit 214 and an OR circuit 215. An output of the AND circuit 214 and an output of the OR circuit 215 are supplied to an exclusive OR circuit 216.

This decoder 5A judges the on or off state of the operation key 22 in units of five frames.

If the operation key 22 is turned off, data "1" is outputted from the comparing circuit 212 continuously over five frames, so that all the five outputs U1 to U5 of the shift register 213 attain a high level. Consequently, both the outputs of the AND circuit 214 and the OR circuit 215 attain a high level, so that an output of the exclusive OR circuit 216 attains a low level. In addition, when the remote control transmitter 20 is not within the imaging area A, all the outputs U1 to U5 attain a low level. Consequently, both the outputs of the AND circuit 214 and the OR circuit 215 attain a low level, so that the output of the exclusive OR circuit similarly attains a low level.

If the remote control transmitter 20 is within the imaging area A and the operation key 22 is turned on, a carrier modulated by the operation pulse (a wave to be modulated) is received by the CCD 1. Accordingly, the continuous five frames are present as a mixture of a frame in which an output of the CCD 1 corresponding to only a portion having a small amplitude of the wave to be modulated is obtained and a frame in which an output of the CCD 1 corresponding to a portion including a portion having a large amplitude of the wave to be modulated is obtained. Consequently, the five outputs U1 to U5 of the shift register 213 are present as a mixture of high and low level outputs. Therefore, the output of the AND circuit 214 attains a low level, and the output of the OR circuit 215 attains a high level, so that the output of the exclusive OR circuit attains a high level.

More specifically, the output of the decoder 5A attains a low level when the operation key 22 is not depressed, while attaining a high level when it is depressed. The signal outputted from the decoder 5A is used as a signal for controlling the operation of the television receiver as an on-off signal of the operation key 22.

Referring to FIGS. 17 to 20, a third embodiment of the present invention will be described.

In the above described second embodiment, when light rays emitted from the remote control transmitter 20 are temporarily cut off, a signal similar to the signal outputted from the remote control transmitter 20 when the operation key 22 in the remote control transmitter 20 is depressed is outputted from the remote control transmitter 20. Therefore, there is a possibility that the on state of the operation key 22 is erroneously detected on the basis of the signal outputted when the light rays emitted from the remote control transmitter 20 are temporarily cut off.

In order to avoid such erroneous detection, the number of signals sampled by the decoder 5A may be large. For example, although in the above described second embodiment, signals corresponding to the five frames are sampled, signals corresponding to the larger number of frames may be sampled. If the number of signals sampled by the decoder 5A is made larger, however, the detection response of the on state of the operation key 22 is degraded and the circuit arrangement of the decoder 5A becomes complicated.

Figure 17:
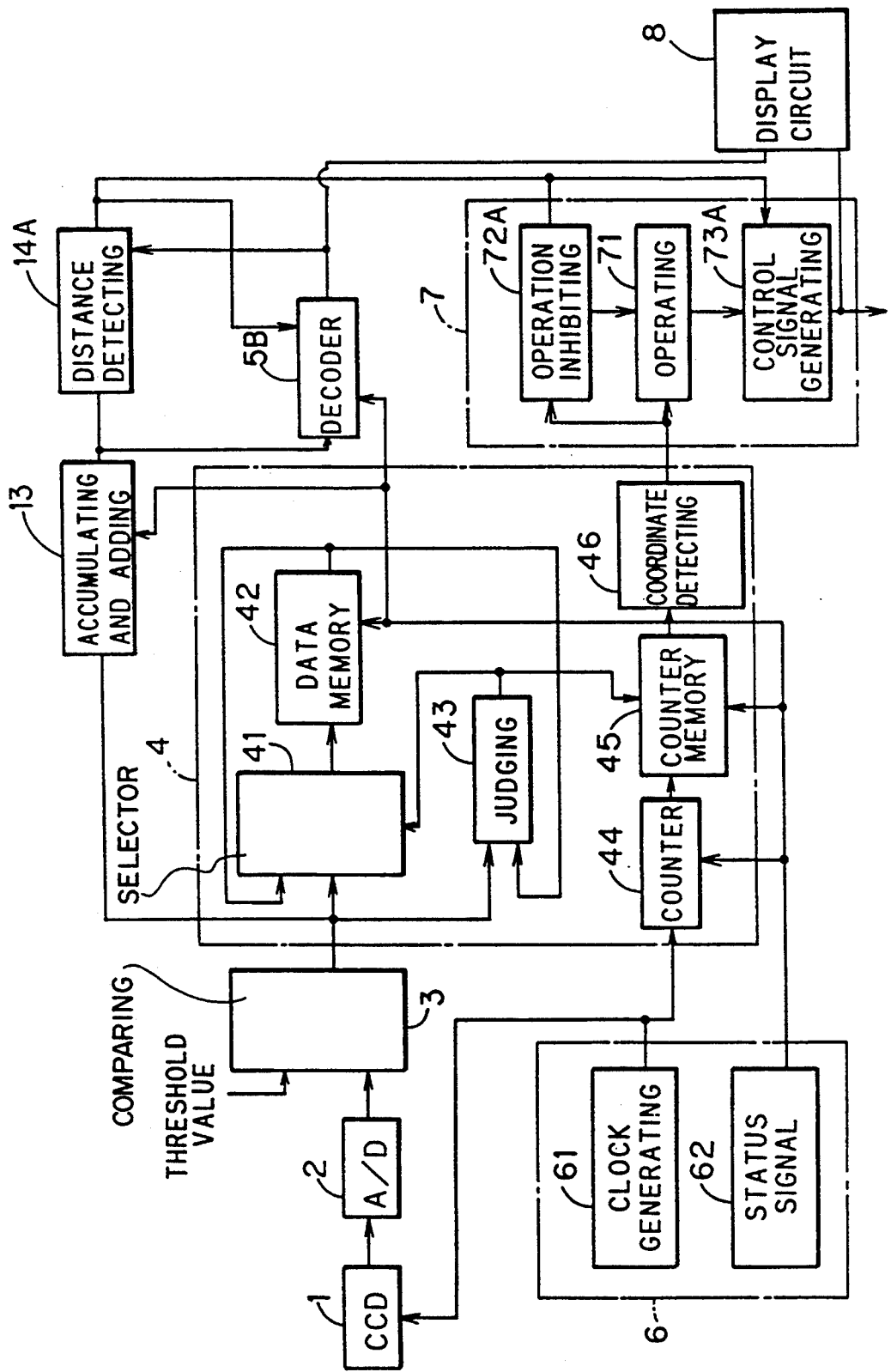
FIG. 17 is an electrical block diagram showing the schematic construction of another receiving device.

FIG. 17 shows a receiving device capable of preventing the on state of an operation key 22 from being erroneously detected on the basis of a signal outputted when light rays emitted from a remote control transmitter 20 is temporarily cut off. In the receiving device shown in FIG. 17, the structure of a distance detecting circuit 14A and the structure of a decoder 5B are changed from those in the receiving device shown in FIG. 12. In addition, the difference between the remote control transmitter 20 used for the receiving device shown in FIG. 17 and the remote control transmitter 20 used for the receiving device shown in FIG. 12 is a control circuit of an infrared light emitting diode 21.

Figure 18:
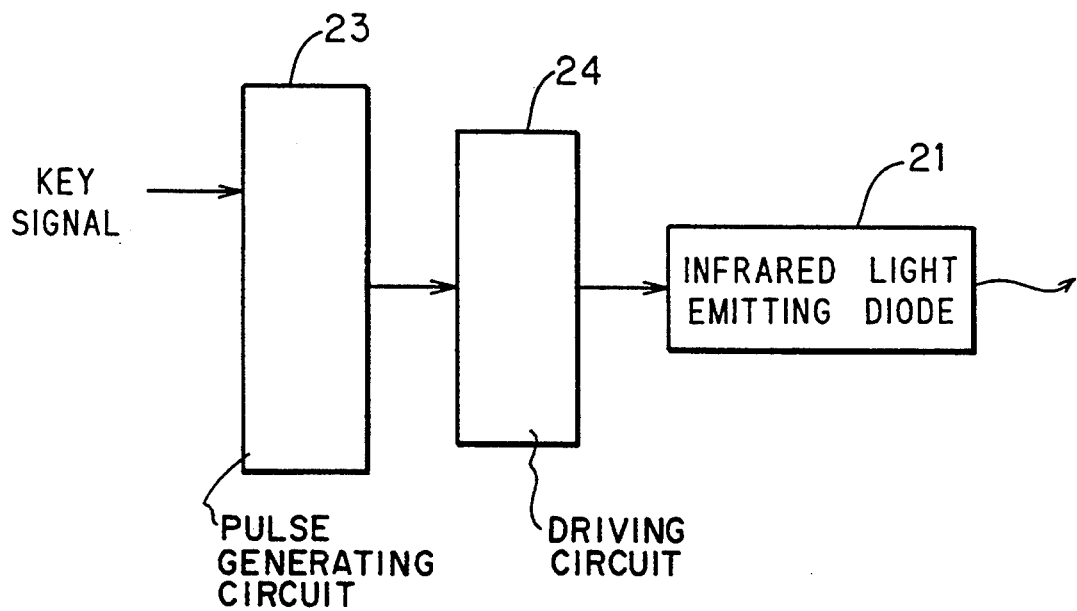
FIG. 18 is an electrical block diagram showing a control circuit of an infrared light emitting diode provided in a remote control transmitter.

FIG. 18 shows the structure of the control circuit of the infrared light emitting diode 21 provided in the remote control transmitter 20.

The control circuit of the infrared light emitting diode 21 comprises a pulse generating circuit 23 and a driving circuit 24. When the operation key 22 in the remote control transmitter 20 is not depressed, a key signal inputted to the pulse generating circuit 23 is at a high level. When the operation key 22 is depressed, the key signal inputted to the pulse generating circuit 23 is changed to a low level.

The pulse generating circuit 23 generates a pulse signal having a large amplitude when the key signal is at a high level, while generating a pulse signal having a small amplitude when it is at a low level. The driving circuit 24 drives the infrared light emitting diode 21 by a driving signal corresponding to the pulse signal sent from the pulse generating circuit 23.

Figure 19:
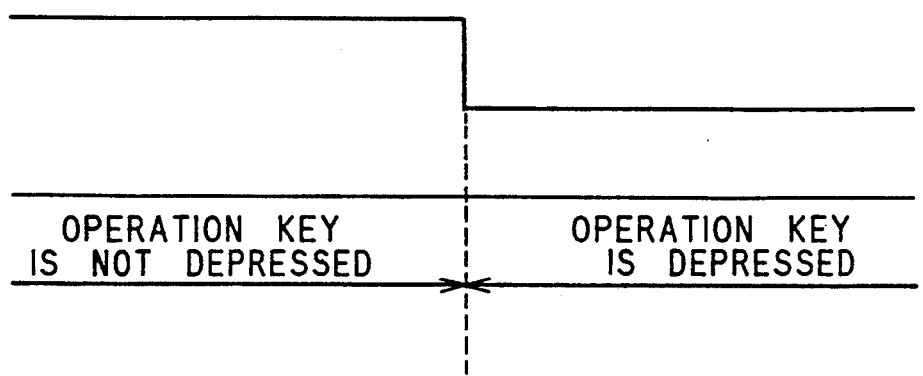
FIG. 19 is a timing chart showing a signal outputted from a remote control transmitter.

Consequently, a remote control signal outputted from the infrared light emitting diode 21 is so controlled that a light output in a case where the operation key 22 in the remote control transmitter 20 is depressed is smaller than a light output in a case where the operation key 22 in the remote control transmitter 20 is not depressed, as shown in FIG. 19. For example, the remote control signal is so controlled that the light output in a case where the operation key 22 in the remote control transmitter 20 becomes one-half the light output in a case where the operation key 22 in the remote control transmitter 20 is not depressed.

As a result, an output value of an accumulating and adding circuit 13 in a case where the operation key 22 is not depressed is more than an output value of the accumulating and adding circuit 13 in a case where the operation key 22 is depressed.

Meanwhile, the light emitting diode 21 may be driven by a DC voltage which is high in value when the key signal is at a high level, while being driven by a DC voltage which is low in value when the key signal is at a low level.

Figure 20:
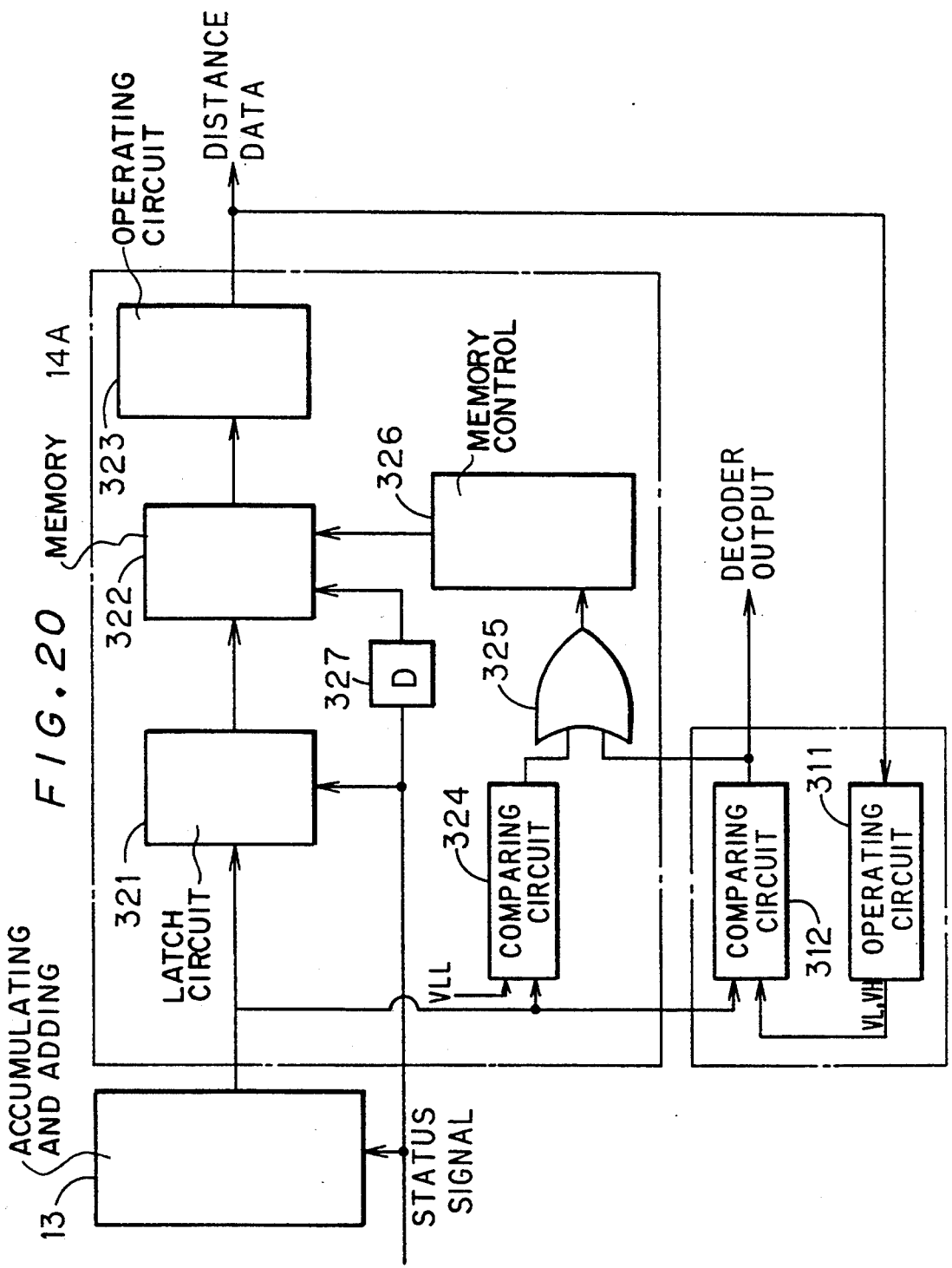
FIG. 20 is an electrical block diagram showing the structures of a decoder 5B and a distance detecting circuit 14A shown in FIG. 17.

FIG. 20 shows the structures of the decoder 5B and the distance detecting circuit 14A.

The decoder 5B generates a high level signal when the operation key 22 in the remote control transmitter 20 is turned on, while generating a low level signal when the operation key 22 is turned off. The distance detecting circuit 14A is for finding the distance between a CCD 1 and the infrared light emitting diode 21 in the remote control transmitter 20 on the basis of signal strength data outputted from the accumulating and adding circuit 13.

The decoder 5B comprises an operating circuit 311 and a comparing circuit 312. The operating circuit 311 generates two threshold values VH and VL (VH>VL) in response to distance data from the distance detecting circuit 14A. The relationship between the signal strength data outputted from the accumulating and adding circuit 13 and the distance between the CCD 1 and the infrared light emitting diode 21 in the remote control transmitter 20 is as shown in FIG. 13.

The operating circuit 311 finds the signal strength from the distance data from the distance detecting circuit 14A on the basis of the relationship between the signal strength and the distance shown in FIG. 13. A value obtained by halving the found signal strength is taken as a reference value, a value obtained by adding a predetermined allowed value to the reference value is taken as a first threshold value VH, and a value obtained by subtracting the predetermined allowed value from the reference value is taken as a second threshold value VL. The reference value theoretically becomes equal to the output value of the accumulating and adding circuit 13 in a case where the operation key 22 is depressed.

It is for allowing the variation in the output value of the accumulating and adding circuit 13 due to noise or the like that the allowed value is added or subtracted to or from the reference value to find the threshold values. The allowed value is set to, for example, 10 percent of the reference value. The first threshold value VH thus set becomes a value between the output value of the accumulating and adding circuit 13 in a case where the operation key 22 is not depressed and the output value of the accumulating and adding circuit 13 in a case where the operation key 22 is depressed. In addition, the threshold value L becomes a value more than zero and less than the output value of the accumulating and adding circuit 13 in a case where the operation key 22 is depressed.

The comparing circuit 312 judges that the operation key 22 is not depressed when the signal strength data outputted from the accumulating and adding circuit 13 is not within a range between the threshold value VL and the threshold value VH, to output a low level signal. On the other hand, the comparing circuit 312 judges that the operation key 22 is depressed when the signal strength data outputted from the accumulating and adding circuit 13 is within the range between the threshold value VL and the threshold value VH, to output a high level signal.

When the light rays emitted from the remote control transmitter 20 are temporarily cut off, the signal strength data outputted from the accumulating and adding circuit 13 becomes zero. In this case, therefore, it is judged that the signal strength data outputted from the accumulating and adding circuit 13 is not within the range between the threshold value VL and the threshold value VH, so that a low level signal is outputted from the comparing circuit 312. Specifically, erroneous judgment that the operation key 22 is depressed when the light rays emitted from the remote control transmitter 20 are temporarily cut off is not made.

The distance detecting circuit 14A comprises a latch circuit 312, a memory 322, an operating circuit 323, a comparing circuit 324, an OR circuit 325, a memory control circuit 326, and a delay circuit 327.

The signal strength data outputted from the accumulating and adding circuit 13 is latched in the latch circuit 321 at timing at which the status signal rises. A write timing signal is outputted at timing slightly later than the timing at which the status signal rises from the delay circuit 327. When a rewrite inhibit signal is not outputted from the memory control circuit 326, therefore, the signal strength data latched in the latch circuit 321 is written to the memory 322 at timing slightly later than the timing at which the status signal rises.

The signal strength data stored in the memory 322 is sent to the operating circuit 323. The operating circuit 323 finds distance data corresponding to the sent signal strength data on the basis of the relationship between the signal strength and the distance shown in FIG. 13.

The signal strength data outputted from the accumulating and adding circuit 13 is also sent to the comparing circuit 324. The comparing circuit 324 compares a threshold value VLL less than the threshold value VL used in the comparing circuit 312 in the decoder 5B with the signal strength data, to output a low level signal when the signal strength data is more than the threshold value VLL, while outputting a high level signal when the signal strength data is not more than the threshold value VLL. When the light rays emitted from the remote control transmitter 20 are temporarily cut off, therefore, an output of the comparing circuit 324 attains a high level.

The output of the comparing circuit 324 and the output of the decoder 5B are inputted to the OR circuit 325. A high level signal is outputted from the decoder 5B when the operation key 22 is turned on, while a low level signal is outputted from the decoder 5B when it is turned off. Consequently, an output of the OR circuit 325 attains a high level when the operation key 22 is turned on or the light rays emitted from the remote control transmitter 20 are temporarily cut off. On the other hand, when the operation key 22 is turned off, the output of the OR circuit attains a low level.

The memory control circuit 326 outputs a rewrite inhibit signal only when the output of the OR circuit 325 is at a high level. Specifically, when the operation key 22 is turned on or the light rays emitted from the remote control transmitter 20 are temporarily cut off, the rewrite inhibit signal is outputted from the memory control circuit 326.

When the rewrite inhibit signal is outputted from the memory control circuit 326, writing of data to the memory 322 is inhibited. Consequently, the signal strength data latched in the latch circuit 321 at timing at which the status signal rises is not written to the memory 322 in this case. Specifically, signal strength data obtained in a frame one frame ahead of a frame in a case where the operation key 22 is depressed or the light rays emitted from the remote control transmitter 20 are temporarily cut off remains stored in the memory 322.

As a result, the distance data outputted from the operating circuit 323 does not vary even if the operation key 22 is depressed or the light rays emitted from the remote control transmitter 20 are temporarily cut off so that the output value of the accumulating and adding circuit 13 is changed.

In a state where the operation key 22 in the remote control transmitter 20 is depressed so that the rewrite inhibit signal is outputted from the memory control circuit 326, if the operation key 22 is turned off, the output of the decoder 5B is changed from a high level to a low level. Consequently, no rewrite inhibit signal is outputted from the memory control circuit 325, so that the signal strength data latched in the latch circuit 321 at timing at which the status signal rises is written to the memory 322. The distance data corresponding to the written signal strength data is found by the operating circuit 323 and is outputted.

Furthermore, in a state where the light rays emitted from the remote control transmitter 20 are temporarily cut off so that the rewrite inhibit signal is outputted from the memory control circuit 326, if the light rays emitted from the remote control transmitter 20 are not cut off, the output of the comparing circuit 324 is changed from a high level to a low level. Consequently, no rewrite inhibit signal is outputted from the memory control circuit 325, so that the signal strength data outputted from the latch circuit 321 is written to the memory 322 at timing at which the status signal rises.

In the above described third embodiment, erroneous judgment that the operation key 22 is depressed when the light rays emitted from the remote control transmitter 20 are temporarily cut off is prevented. In addition, it can be judged whether the operation key 22 is turned on or turned off by only changing the intensity of the light rays emitted from the remote control transmitter 20 in two stages depending on whether or not the operation key 22 is depressed, so that the structure of the control circuit of the infrared light emitting diode 21 in the remote control transmitter 20 is simplified.

Figure 21:
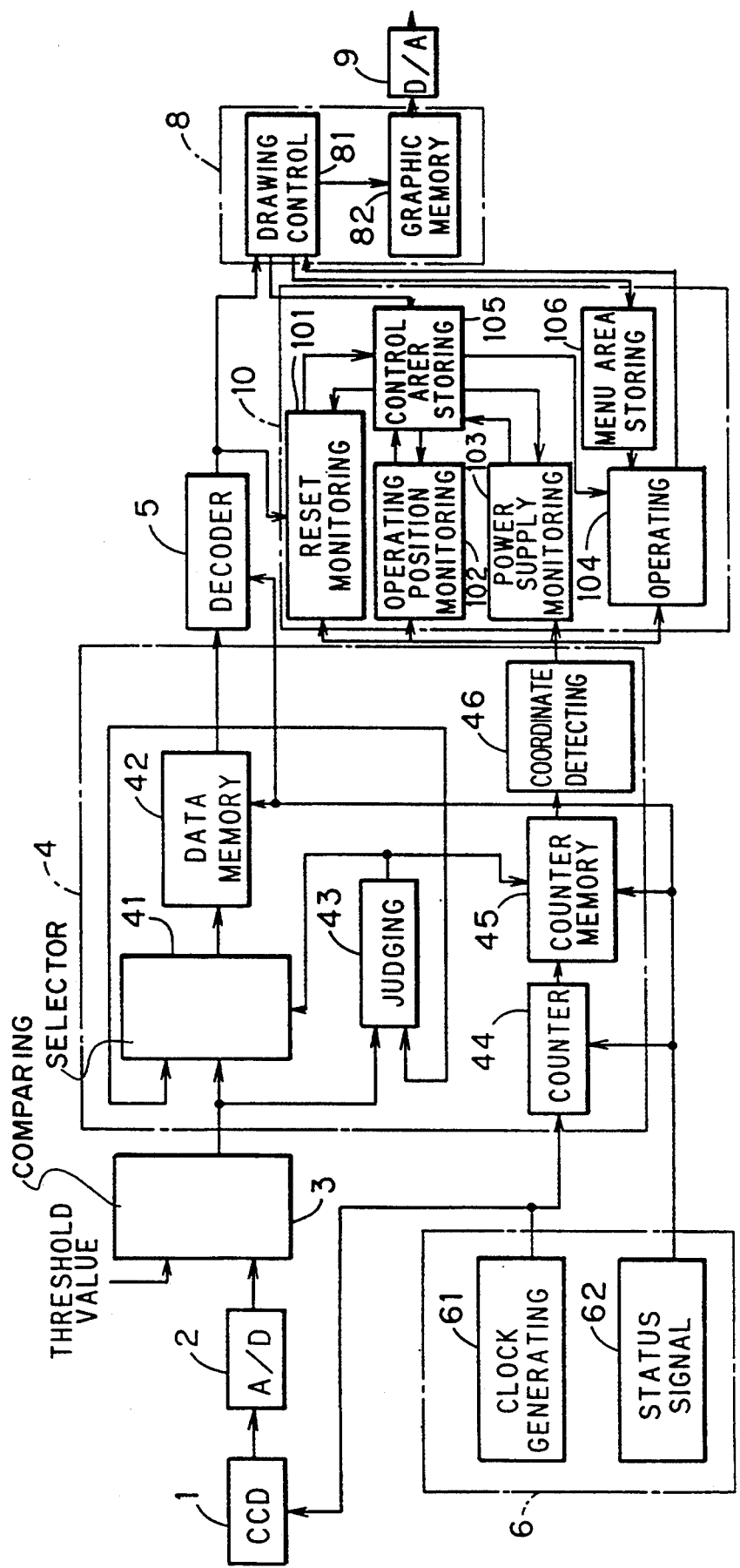
FIG. 21 is an electrical block diagram showing the schematic construction of another receiving device.
Figure 22A:
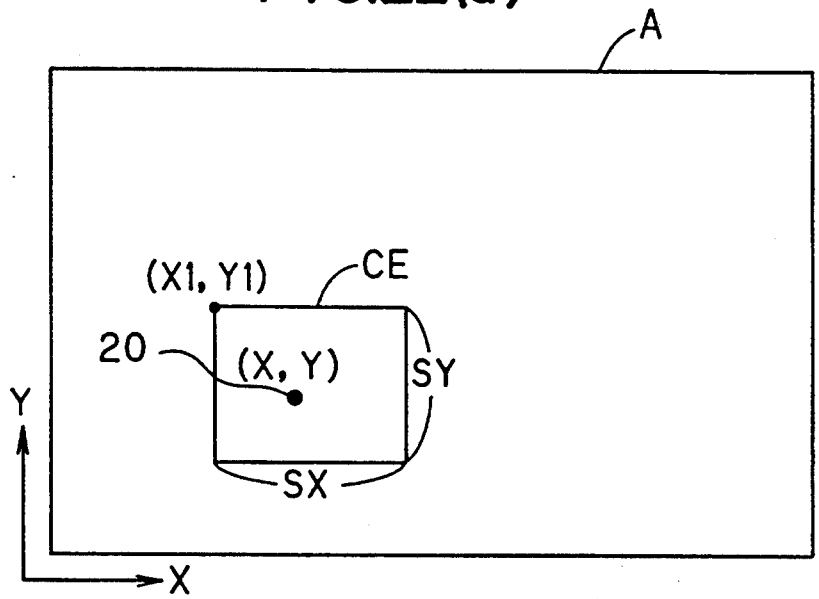
FIG. 22(a-b) is a schematic diagram showing a menu area ME set on a display screen B of a display device 31 and a control area CE set in an imaging area A.
Figure 22B:
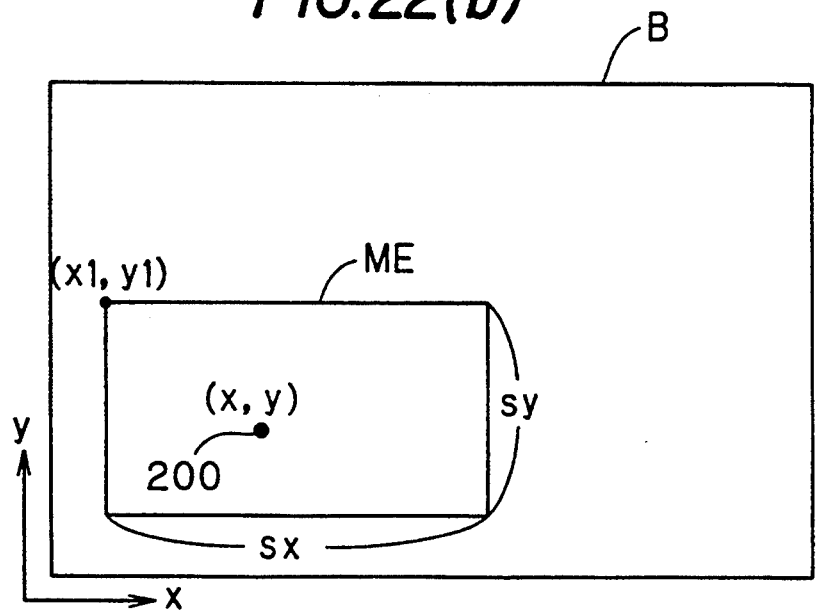
Figure 23:
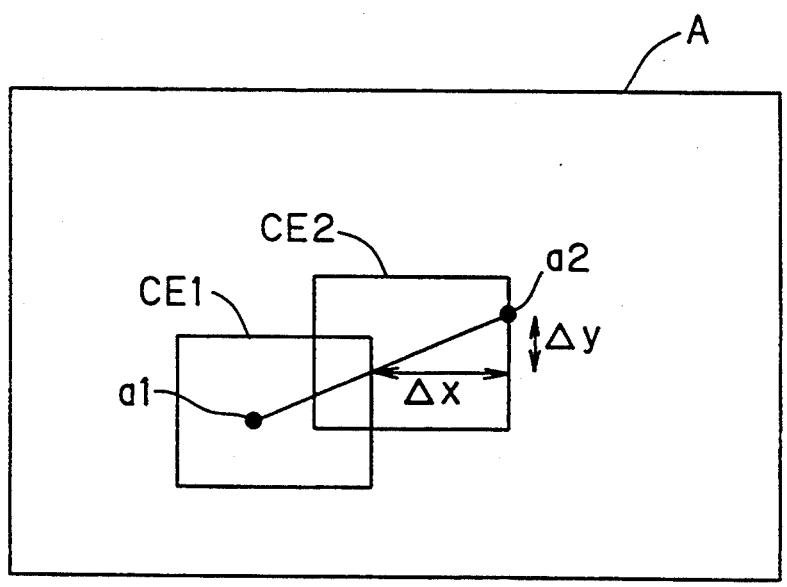
FIG. 23 is a schematic diagram showing a control area CE2 newly set when a remote control transmitter goes out of a control area CE1.

Referring to FIGS. 21 to 23, a fourth embodiment of the present invention will be described.

FIG. 21 shows a receiving device. In FIG. 21, the same portions as those shown in FIG. 4 are assigned the same reference numerals and hence, the description thereof is omitted.

The difference between the receiving device shown in FIG. 21 and the receiving device shown in FIG. 4 is a cursor control circuit. A cursor control circuit 10 in the receiving device will be described with reference to FIGS. 22 and 23.

FIG. 22 (b) illustrates a menu area ME set in a display screen B of a display 31. The menu area ME is an area where a cursor 200 can be moved on the display screen B.

FIG. 22 (a) illustrates a control area CE in an imaging area A. The cursor 200 can be moved over the whole menu area ME by moving a remote control transmitter 20 in the control area CE.

A position in the imaging area A is represented by an X-Y coordinate system. The origin shall be set in a lower left end of the imaging area A. In addition, a position in the display screen B is represented by an x-y coordinate system. The origin shall be set in a lower left end of the display screen B.

The cursor control circuit 10 comprises a reset monitoring portion 101, an operating position monitoring portion 102, a power supply monitoring portion 103, an operating portion 104, a control area storing portion 105, and a menu area storing portion 106.

The menu area storing portion 106 stores coordinates (x1, y1) in an upper left end of the menu area ME, the length in the horizontal direction SX of the menu area ME, and the length in the vertical direction SY of the menu area ME. The control area storing portion 105 stores coordinates (X1, Y1) in an upper left end of the control area CE, the length in the horizontal direction SX of the control area CE, and the length in the vertical direction SY of the control area CE.

The operating portion 104 finds coordinates (x, y) of the position of the cursor 200 on the display screen B on the basis of the following equations (1) and (2) from coordinates (X, Y) of the position of the remote control transmitter 20 in the control area CE. Specifically, coordinates ((X−X1), (Y1−Y)) of the relative position of the remote control transmitter 20 within the control area CE are converted into coordinates within the menu area ME.

$$x = x1 + (X - X1) \cdot (Sx/SX) \quad (1)$$

$$y = y1 - (Y1 - Y) \cdot (Sy/SY) \quad (2)$$

If the position or the size of the menu area ME displayed on the display screen B are changed, the contents of the menu area storing portion 106 are rewritten by a drawing control portion 81 in a display circuit 8. Particularly when the size of the menu area ME is changed, the size of the control area CE stored in the control area storing portion 105 is simultaneously changed in accordance with the following equations:

$$SX = SX' \cdot (Sx/Sx') \quad (3)$$

$$SY = SY' \cdot (Sy/Sy') \quad (4)$$

SX, SY: the size of the present control area CE
SX', SY': the size of the preceding control area CE
Sx, Sy: the size of the present menu area ME
Sx', Sy': the size of the preceding menu area ME When another menu which differs in the size of the menu area ME is displayed on the display screen B by performing a menu operation to select a certain function, an unnatural impression is given if the range in which an operator operates the remote control transmitter 20 is the same as the preceding range. Therefore, the size of the control area CE is changed depending on the size of the menu area ME, to achieve a natural operating environment.

If the control area CE is greatly shifted from the position of the operator, it is difficult to operate the remote control transmitter 20, thereby to automatically set the most suitable control area CE by the following method. Specifically, when the power supply monitoring portion 103 detects the application of the power supply of the remote control transmitter 20, it finds coordinates (X1, Y1) in an upper left end of a new control area CE by the following equations (5) and (6) on the basis of the position data (X, Y) representing the remote control transmitter 20 which is sent from a coordinate detecting circuit 46 and the length in the horizontal direction SX of the control area CE and the length in the vertical direction SY of the control area CE which are stored in the control area storing portion 105 and stores the coordinates in the control area storing portion 105. Specifically, data concerning the position of the control area CE within the control area storing portion 105 is updated.

$$X1 = X - (SX/2) \quad (5)$$

$$Y1 = Y - (SY/2) \quad (6)$$

Since the operator turns the power supply of the remote control transmitter 20 on in the vicinity of the center of his body in many cases, the control area CE is set in the vicinity of the center of the body of the operator by the operation of the power supply monitoring portion 103. In this case, the cursor 200 is also displayed in the center of the menu area ME.

Meanwhile, if the control area CE remains fixed in a case where the operator moves, the control area CE is separated from the body of the operator, thereby to make it difficult to operate the remote control transmitter 20. In the present embodiment, therefore, the position of the hand of the operator operating the remote control transmitter 20 (hereinafter referred to as the operating position) is monitored, and the control area CE is automatically moved when the operating position is changed, thereby to make it possible to perform the operation over the whole imaging area A.

More specifically, the operating position monitoring portion 102 monitors the position of the remote control transmitter 20 which is sent from a coordinate detecting circuit 46, and judges that the operating position of the remote control transmitter 20 is changed when the position of the remote control transmitter 20 goes out of the control area CE stored in the control area storing portion 105. The coordinates (X1, Y1) in an upper left end of the control area CE which are stored in the control area storing portion 105 are changed by the amounts ΔX and ΔY of deviation of the remote control transmitter 20 from the control area CE.

FIG. 23 shows how the control area CE is moved when the remote control transmitter 20 is moved from a1 to a2. In FIG. 23, CE1 and CE2 respectively indicate an old control area and a new control area.

Meanwhile, the operating position may, in some case, be changed even if the operator does not move, as, for example, in a case where the operator passes the remote control transmitter 20 from the right hand to the left hand. In such a case, the operating position is not significantly changed. When the operator passes the remote control transmitter 20 from one hand to the other, therefore, the control area CE is not always immediately changed. In such a case, it is convenient to allow the control area CE to be forcedly changed by the operator.

In the present embodiment, therefore, means for the operator to reset the control area CE is prepared. As the means to reset the control area CE, a dedicated reset key may be provided in the remote control transmitter 20. However, the operation key 22 in the remote control transmitter 20 is intermittently depressed (so-called double click) to generate a reset signal.

A state where the operation key 22 in the remote control transmitter 20 is intermittently depressed is detected by the reset monitoring portion 101 on the basis of an output of a decoder 5. When the reset monitoring portion 101 detects the state where the operation key 22 in the remote control transmitter 20 is intermittently depressed, it finds coordinates (X1, Y1) in an upper left end of a new control area CE by the foregoing equation (3) on the basis of the data (X, Y) from the coordinate detecting circuit 46 and the length in the horizontal direction SX of the control area CE and the length in the vertical direction SY of the control area CE which are stored in the control area storing portion 105 and stores the coordinates in the control area storing portion 105.

Coordinate data (x, y) representing the cursor 200 which is outputted by the operating portion 104 and an on-off signal of the operation key 22 which is outputted from the decoder 5 are sent to the drawing control portion 81 in the display circuit 8 and is drawn in the on or off state in a corresponding position of a graphic memory 82. An output of the graphic memory 82 is sent to a display device 31 through a digital-to-analog converter 9.

A fifth embodiment of the present invention will be described with reference to FIGS. 24 to 27.

Figure 24:
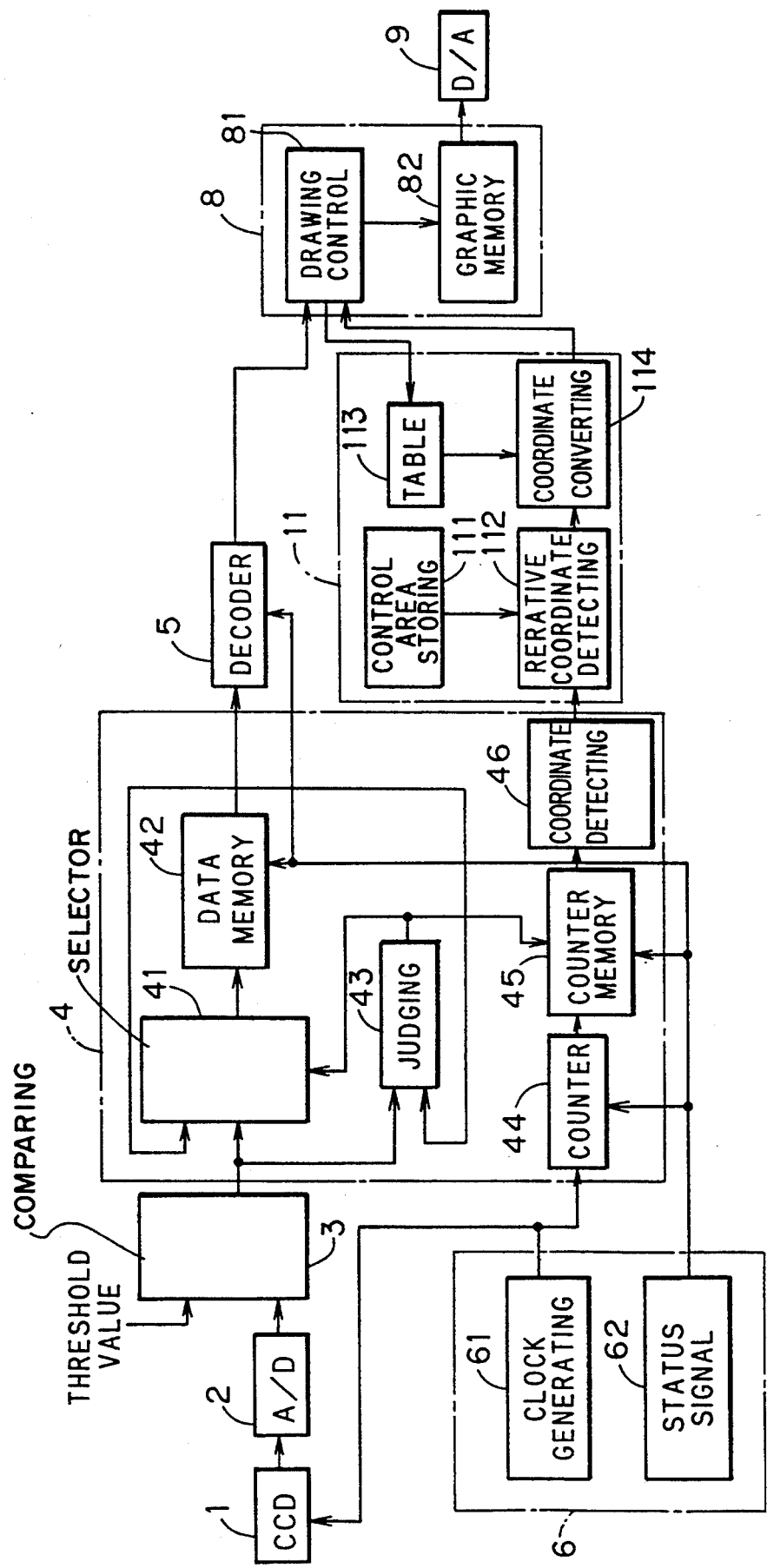
FIG. 24 is an electrical block diagram showing the schematic construction of still another receiving device.

FIG. 24 shows a receiving device. In FIG. 24, the same portions as those shown in FIG. 4 are assigned the same reference numerals and hence, the description thereof is omitted.

The difference between the receiving device shown in FIG. 24 and the receiving device shown in FIG. 4 is a cursor control circuit. A cursor control circuit 11 in this receiving device comprises a control area storing portion 11, a relative coordinate detecting portion 112, a table 113, and a coordinate converting portion 114.

FIG. 25 illustrates a control area CE set in an imaging area A. A cursor 200 can be moved over the whole of a display screen B of a display device 31 by moving a remote control transmitter 20 within the control area CE.

FIG. 26 illustrates the display screen B of the display device 31 and the control area CE set in the imaging area A. The display screen B is divided into a plurality of blocks B1, B2, B3, . . . Bn of the same size. On the other hand, the control area CE is divided into blocks A1, A2, A3, . . . An which are the same in number as the blocks in the display screen B. The blocks B1 to Bn in the display screen B respectively correspond to the blocks A1 to An in the control area CE. One display position of the cursor 200 (not shown) is set in each of the blocks B1 to Bn in the display screen B. The display position of the cursor 200 is so set that the center of an icon on a menu is in the display position of the cursor 200.

The control area storing portion 111 stores coordinates (X1, Y1) in an upper left end of the control area CE, and the length in the horizontal direction SX of the control area CE and the length in the vertical direction SY of the control area CE as shown in FIG. 25. The contents of the control area storing portion 111 can be changed depending on the change in the operating position or the like, as in the control area storing portion 105 shown in FIG. 21.

The relative coordinate detecting portion 112 finds relative coordinates (ΔX, ΔY) in the control area CE by the following equations (7) and (8) on the basis of position data (X, Y) representing the remote control transmitter 20 which is sent from a coordinate detecting circuit 46 and the length in the horizontal direction SX of the control area CE and the length in the vertical direction SY of the control area CE which are stored in the control area storing portion 111:

$$\Delta X = X - X1 \qquad (7)$$

$$\Delta Y = Y1 - Y \qquad (8)$$

The relative coordinates ($\Delta X$, $\Delta Y$) indicate the position of the remote control transmitter 20 in an X-Y coordinate system utilizing as the origin the point (X1, Y1) in an upper left end of the control area CE.

FIG. 27 shows the contents of the table 113.

The table 113 stores for data representing the blocks A1 to An in the control area CE shown in FIG. 26 coordinates of the display positions of the cursor 200 (cursor coordinates) which are set for the blocks B1 to Bn in the display screen B respectively corresponding to the blocks A1 to An. As data representing each of the blocks A1 to An in the control area CE, coordinates (relative coordinates) in an upper left end and coordinates (relative coordinates) in a lower right end in the block are used.

The coordinate converting portion 114 reads out from the table 113 the cursor coordinates corresponding to the block A1 to An in the control area CE including the relative coordinates ($\Delta X$, $\Delta Y$) found by the relative coordinate detecting portion 112 and outputs the same. For example, coordinates (x2, y2) are read out from the table 113 as cursor coordinates if $a2 \leq \Delta X \leq b2$ and $c2 \leq \Delta Y \leq d2$.

The cursor coordinates outputted from the coordinate converting portion 114 are sent to a drawing control portion 81, so that the cursor 200 is drawn in a corresponding position of a graphic memory 82. An output of the graphic memory 82 is sent to a display device 31 through a digital-to-analog converter 9, so that the cursor 200 is displayed on the display screen B.

According to the fifth embodiment, it is possible to display the cursor 200 in the center of an icon.

A menu generally has a hierarchical structure in many cases, so that the menu must be changed. On a menu obtained by the change, an icon is displayed in a different position from the position of the icon on the menu before the change in many cases. In the present embodiment, therefore, the contents of the table 113 are rewritten by the drawing control portion 81 so that the cursor coordinates are set in the center of the icon in conformity with the menu.

Meanwhile, the remote control transmitter 20 is operated with it being held by an operator. Even if the operator intends to stop the remote control transmitter 20, therefore, the remote control transmitter 20 vibrates by the unintentional movement of the hand of the operator. If the remote control transmitter 20 vibrates by the unintentional movement of the hand of the operator, the cursor 200 on the display screen B also vibrates. Therefore, the cursor 200 on the screen flickers, thereby to make it difficult to see the screen.

Figure 28:
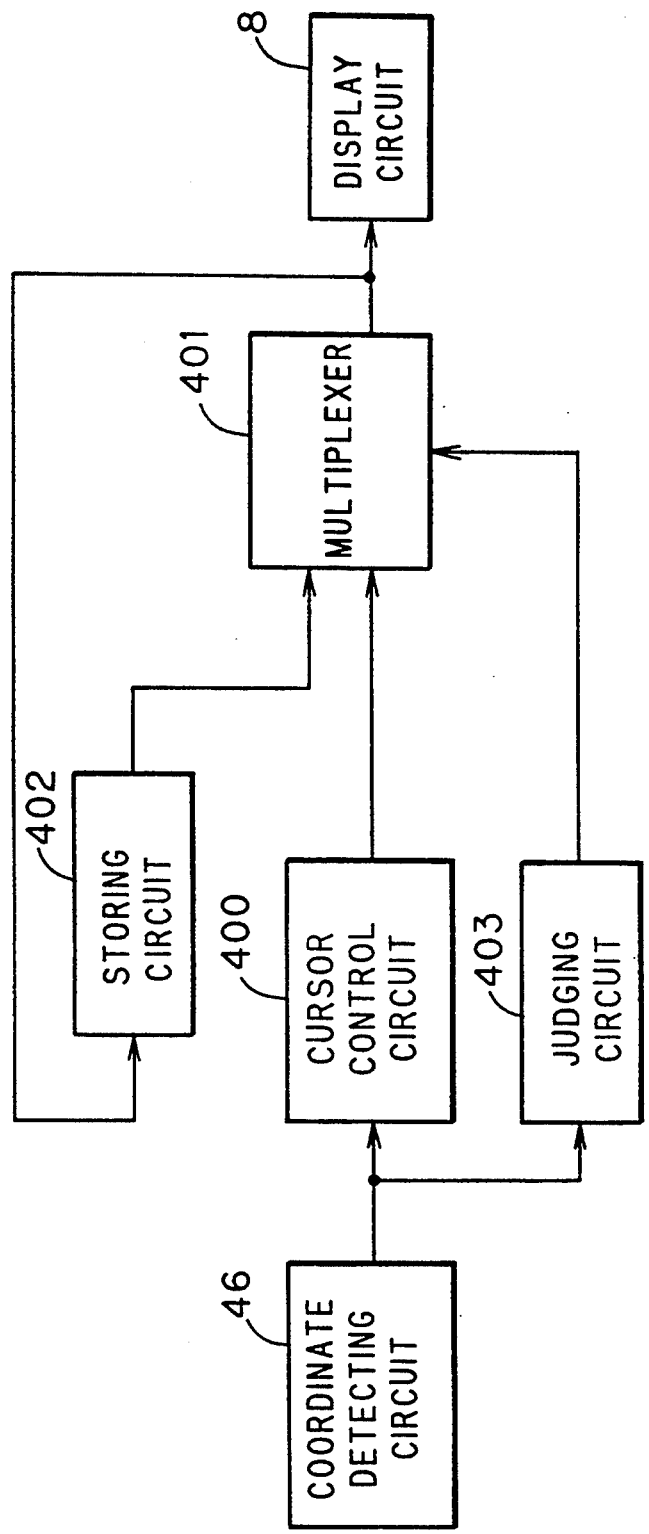
FIG. 28 is an electrical block diagram showing a circuit for preventing a cursor from being vibrated due to the unintentional movement of the hand.

FIG. 28 shows a circuit for preventing the cursor 200 from vibrating on the basis of the unintentional movement of the hand of an operator.

Examples of a cursor control circuit 400 is one for converting coordinates of an image of the remote control transmitter 20 which are found by the coordinate detecting circuit 46 in the above described maximum value detecting circuit 4 into position coordinates of the cursor 200 on the display screen B on the basis of the following equation for conversion (9) ((10)):

$$x = mX + a \qquad (9)$$

$$y = nY + b \qquad (10)$$

x: x-coordinate of the cursor 200 on the display screen B y: y-coordinate of the cursor 200 on the display screen B X: X-coordinate of the image of the remote control transmitter 20 which is found by the coordinate detecting circuit 46

Y: Y-coordinate of the image of the remote control transmitter 20 which is found by the coordinate detecting circuit 46 m, n, a, b: constant

Coordinate data (X, Y) representing the image of the remote control transmitter 20 on the CCD 1 is sent for each frame from the above described coordinate detecting circuit 46 to the cursor control circuit 400. Cursor control data (cursor coordinate data) outputted from the cursor control circuit 400 is sent to a multiplexer 401. An output of a storing circuit 402 is also inputted to the multiplexer 401. The preceding cursor control data outputted from the multiplexer 401 is also stored in the storing circuit 402. An output of the multiplexer 401 is sent to the above described display circuit 8.

The multiplexer 401 selects the input data from the cursor control circuit 400 or the input data from the storing circuit 402 in response to a selection signal outputted from a judging circuit 403 and outputs the same.

The judging circuit 403 judges whether the position of the remote control transmitter 20 varies due to the unintentional movement of the hand or due to the movement and the operation of the remote control transmitter 20 on the basis of the coordinate data (X, Y) representing the image of the remote control transmitter 20 which is sent from the coordinate detecting circuit 46. When the position of the remote control transmitter 20 does not vary or when it is judged that the position of the remote control transmitter 20 varies due to the unintentional movement of the hand, it is judged that the remote control transmitter 20 is standing still. On the other hand, when it is judged that the position of the remote control transmitter 20 varies due to the movement and the operation of the remote control transmitter 20, it is judged that the remote control transmitter 20 is moving.

A selection signal corresponding to the result of the judgment as to whether the remote control transmitter 20 is in a still state or in a moving state is outputted from the judging circuit 403. The details of the operation of the judging circuit 403 will be described later.

If the judging circuit 403 judges that the remote control transmitter 20 is in a moving state, the selection signal outputted from the judging circuit 403 is brought into a high level. When the selection signal is at a high level, the multiplexer 401 selects the output of the cursor control circuit 400, to output cursor control data outputted from the cursor control circuit 400.

On the other hand, when the judging circuit 403 judges that the remote control transmitter 20 is in a still state, the selection signal outputted from the judging circuit 403 is brought into a low level. When the selection signal is at a low level, the multiplexer 401 selects an output of the storing circuit 402, to output a cursor control signal outputted from the storing circuit 402. Specifically, when the selection signal attains a low level, the cursor control signal outputted from the multiplexer 401 is outputted immediately before the selection signal is changed to a low level.

Figure 29:
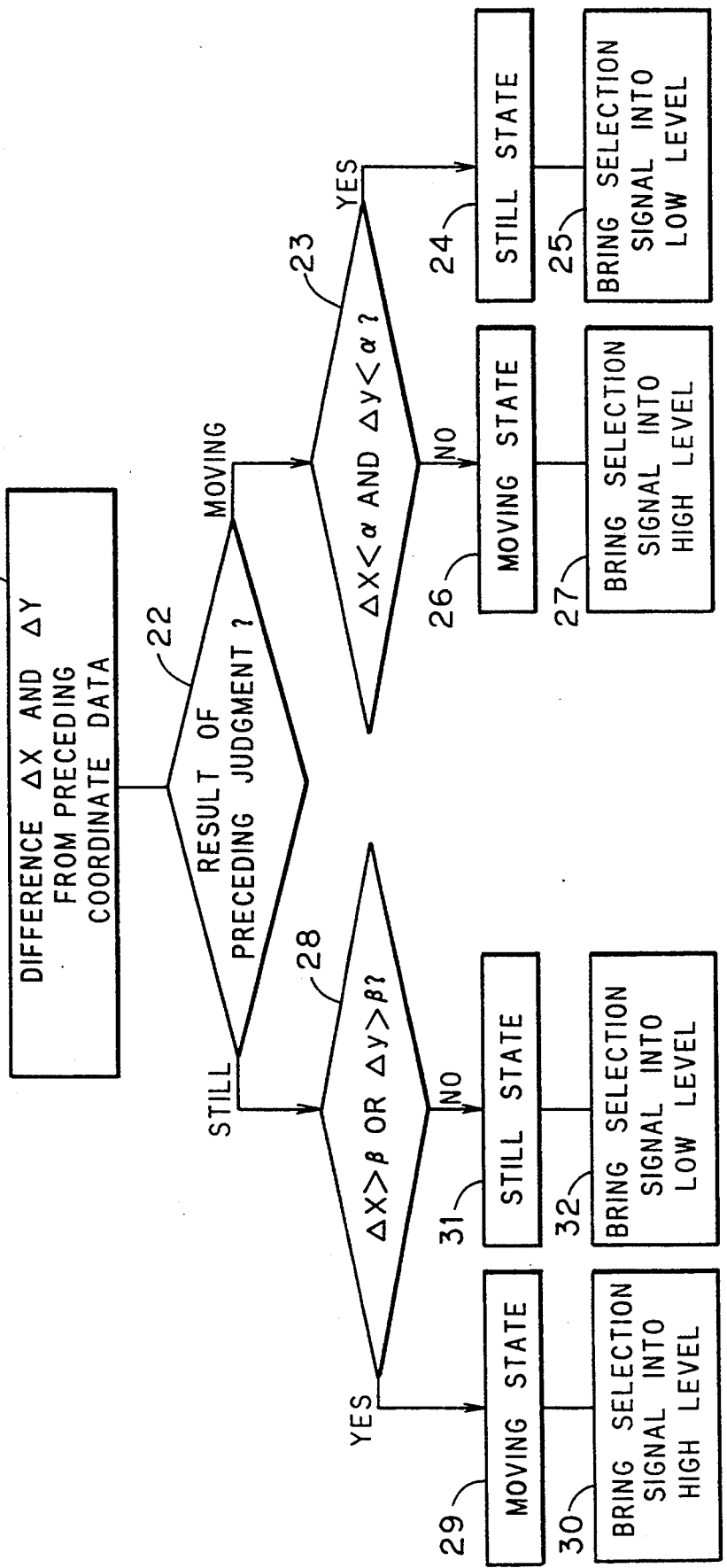
FIG. 29 is a flow chart showing the procedure for processing performed by a judging circuit 403 shown in FIG. 28.

FIG. 29 shows the procedure for processing performed by the judging circuit 403.

Description is first made of the basic idea for judging whether the remote control transmitter 20 is in a moving state or in a still state. In the judging circuit 403, it is judged whether the remote control transmitter 20 is in a moving state or in a still state for each predetermined time period. If the amount of movement of the remote control transmitter 20 in a predetermined time period is larger than the amount of movement of the remote control transmitter 20 due to the unintentional movement of the hand, it is basically judged that the remote control transmitter 20 is in a moving state. On the other hand, if the amount of movement of the remote control transmitter 20 in a predetermined time period is smaller than the amount of movement of the remote control transmitter 20 due to the unintentional movement of the hand, it is basically judged that the remote control transmitter 20 is in a still state.

Coordinate data (X, Y) representing the remote control transmitter 20 which is outputted from the coordinate detecting circuit 46 is accepted in the judging circuit 403 once per a predetermined number of frames (for example, 10 frames). If the coordinate data (X, Y) is accepted, the differences $\Delta X$ and $\Delta Y$ between the coordinate data (X, Y) and coordinate data (X, Y) accepted the last time are found (step 21).

The result of the preceding judgment is judged (step 22). If the result of the preceding judgment is a moving state, it is judged whether or not $\Delta X$ and $\Delta Y$ found in the step 21 are less than a reference value $\alpha$ ($\Delta X < \alpha$ and $\Delta Y < \alpha$) (step 23). The reference value $\alpha$ is set to a value slightly more than the amplitude of vibration on the CCD 1 of the remote control transmitter 20 due to the unintentional movement of the hand.

When the conditions $\Delta X < \alpha$ and $\Delta Y < \alpha$ are satisfied, that is, when both the amounts of movement in the X direction and the Y direction of the remote control transmitter 20 are less than a predetermined value, it is judged that the remote control transmitter 20 is in a still state (step 24), so that the selection signal is brought into a low level (step 25).

On the other hand, when the conditions $\Delta X < \alpha$ and $\Delta Y < \alpha$ are not satisfied, that is, when the amount of movement in the X direction or the Y direction of the remote control transmitter 20 is not less than a predetermined value, it is judged that the remote control transmitter 20 is in a moving state (step 26), so that the selection signal is brought into a high level (step 27).

When in the above described step 22, the result of the preceding judgment is a still state, it is judged whether or not $\Delta X$ or $\Delta Y$ found in the step 21 is more than a reference value $\beta$ ($\Delta X > \beta$ or $\Delta Y > \beta$) (step 28). The reference value $\beta$ is set to a value slightly more than the reference value $\alpha$.

When the condition $\Delta X > \beta$ or $\Delta Y > \beta$ is satisfied, that is, when the amount of movement in the X direction or the Y direction of the remote control transmitter 20 is more than a predetermined value, it is judged that the remote control transmitter 20 is in a moving state (step 29), so that the selection signal is brought into a high level (step 30).

When the condition $\Delta X > \beta$ or $\Delta Y > \beta$ is not satisfied, that is, when both the amounts of movement in the X direction and the Y direction of the remote control transmitter 20 are not more than a predetermined value, it is judged that the remote control transmitter 20 is in a still state (step 31), so that the selection signal is brought into a high level (step 32).

A method of setting the reference values $\alpha$ and $\beta$ will be described concretely.

The amounts of variation $\Delta X$ and $\Delta Y$ of the image of the remote control transmitter 20 on the CCD 1 which are found in the above described step 21 and the actual amounts of variation $\Delta H$ and $\Delta V$ of the remote control transmitter 20 have the relationship represented by the following equations (9) and (10):

$$\Delta X = \{Px/(Qx \times L)\} \times \Delta H \quad (9)$$

$$\Delta Y = \{Py/(Qy \times L)\} \times \Delta V \quad (10)$$

$\Delta H$: the actual amount of variation in the horizontal direction of the remote control transmitter 20

$\Delta V$: the actual amount of variation in the vertical direction of the remote control transmitter 20

Px: the number of pixels in the horizontal direction of the CCD 1

Py: the number of pixels in the vertical direction of the CCD 1

L: the distance between the CCD 1 and the remote control transmitter 20

Qx: a parameter for determining the length in the horizontal direction of an imaging area Qy: a parameter for determining the length in the vertical direction of an imaging area (Qx × L) in the above described equation (9) indicates the length in the horizontal direction of an imaging area at a point spaced apart from the CCD 1 by a distance L. (Qy × L) in the above described equation (10) indicates the length in the vertical direction of the imaging area at the point spaced apart from the CCD 1 by the distance L.

For example, the remote control transmitter 20 shall be operated at a point spaced apart from the CCD 1 by 1000 mm. In addition, let Px=Py=500 and Qx=Qy=1. The amplitude of vibration of the remote control transmitter 20 due to the unintentional movement of the hand of the operator shall be 2 mm. Both the amounts of variation $\Delta X$ and $\Delta Y$ of the remote control transmitter 20 having an amplitude of vibration of 2 mm on the CCD 1 are $\Delta X = \Delta Y = 1$ by the foregoing equations (9) and (10). In this case, the reference value $\alpha$ is set to, for example, a natural number 2 slightly more than the amount of variation $\Delta X$ ($\Delta Y$). On the other hand, the reference value $\beta$ is set to, for example, a natural number 3 slightly more than the reference value $\alpha$.

If the remote control transmitter 20 shall be operated at a point spaced apart from the CCD 1 by 500 mm, $\Delta X = \Delta Y = 2$. The reference value $\alpha$ and the reference value $\beta$ are respectively set to, for example, 3 and 4.

When the amplitude of vibration of the remote control transmitter 20 due to the unintentional movement of the hand differs depending on the horizontal direction and the vertical direction, each of the reference values $\alpha$ and $\beta$ may be set for each horizontal direction and vertical direction. In addition, the amplitude of vibration due to the unintentional movement of the hand differs depending on an operator. Accordingly, it is preferable that each of the reference values $\alpha$ and $\beta$ is changed for each operator. However, it is actually difficult to change each of the reference values $\alpha$ and $\beta$ for each operator.

Therefore, it may be judged whether the remote control transmitter 20 is in a moving state or in a still state by calculating the standard deviation of the amount of movement $\Delta X$ or $\Delta Y$ of the image of the remote control transmitter 20 for each predetermined time period and judging whether the calculated standard deviation is more or less than a predetermined value.

Furthermore, a vibrating sensor may be attached to the remote control transmitter 20, to judge whether the remote control transmitter 20 is in a moving state or in a still state on the basis of an output of the vibrating sensor.

It is possible to use, as the cursor control circuit 400 shown in FIG. 28, a cursor control circuit for finding cursor coordinates on the basis of the coordinates of the image of the remote control transmitter 20 from the coordinate detecting circuit 46, for example, the cursor control circuit 10 or 11 shown in FIG. 21 or 24.

Figure 30:
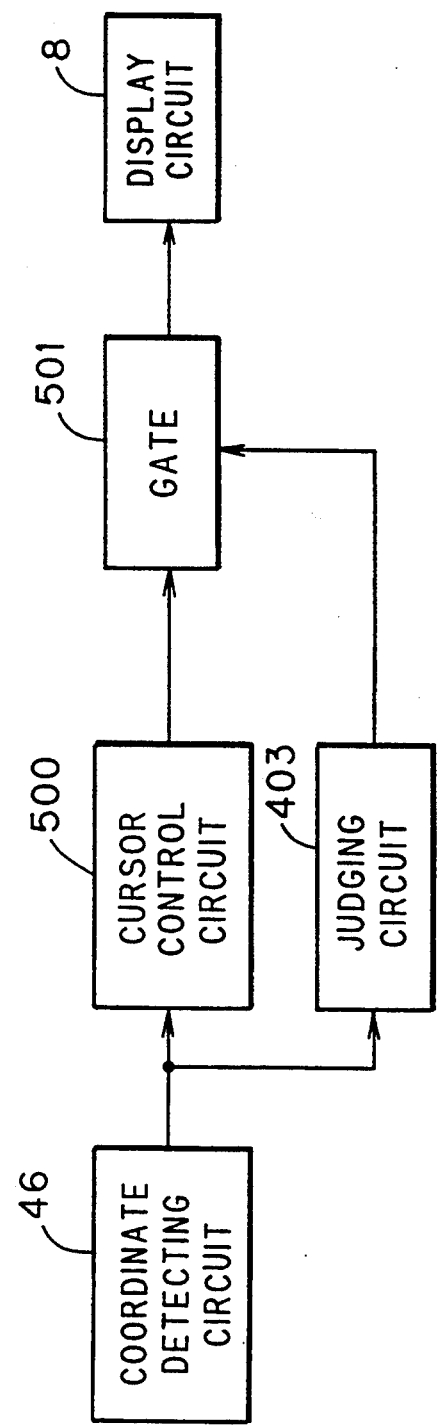
FIG. 30 is an electrical block diagram showing another circuit for preventing a cursor from being vibrated due to the unintentional movement of the hand.

When the cursor control circuit is for finding the amount of movement of the cursor 200 on the basis of the coordinates of the image of the remote control transmitter 20 from the coordinate detecting circuit 46, for example, the cursor control circuit 7 shown in FIG. 4, 12 or 17, it is possible to prevent the vibration of the cursor due to the unintentional movement of the hand by using a circuit as shown in FIG. 30.

In FIG. 30, a cursor control circuit 500 is a cursor control circuit for finding the amount of movement of the cursor 200 on the basis of the coordinates of the image of the remote control transmitter 20 from the coordinate detecting circuit 46, for example, the cursor control circuit 7 shown in FIG. 4, 12 or 17. A judging circuit 403 is the same as the judging circuit 403 shown in FIG. 28.

A gate 501 is always opened. When the judging circuit 403 judges that the remote control transmitter 20 is in a still state, the gate 501 is closed. The gate 501 is maintained in a closed state until the judging circuit 403 judges that the remote control transmitter 20 is in a moving state.

Consequently, cursor control data outputted from the cursor control circuit 500 is always sent to a display circuit 8 through the gate 501. On the other hand, when the judging circuit 403 judges that the remote control transmitter 20 is in a still state, the gate 501 is closed, so that the cursor control data outputted from the cursor control circuit 500 is inhibited from being sent to the display circuit 8. Therefore, the position of the cursor 200 is not changed.

Thereafter, if the judging circuit 402 judges that the remote control transmitter 20 is in a moving state, the gate 501 is opened, so that the cursor control data outputted from the cursor control circuit 500 is sent to the display circuit 8 through the gate 501.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cursor control device comprising:
   a display device having a display screen on which a cursor is displayed;
   a remote control transmitter including a light emitting element for emitting light rays having a particular wavelength for providing inputs to remotely control the cursor displayed on said display device;
   imaging means, having a predetermined image area, for imaging said light rays providing inputs from said light emitting element within the predetermined imaging area;
   distance detecting means for determining the distance between said light emitting element and said imaging means;
   position detecting means for determining the position of said light emitting element on the basis of an output of said imaging means;
   cursor controlling means for determining an amount of movement and a direction of movement of said light emitting element on the basis of the position of said light emitting element which is determined by said position detecting means, for determining the amount of movement of the cursor by multiplying the amount of movement of said light emitting element by a coefficient, and for determining the direction of movement of the cursor on the basis of the direction of movement of said light emitting element, to control the position of the cursor on the display screen on the basis of the determined amount of movement of the cursor and the determined direction of movement of the cursor; and
   coefficient controlling means for controlling said coefficient used for calculating the amount of movement of the cursor by said cursor controlling means on the basis of the distance determined by said distance detecting means.

2. The cursor control device according to claim 1, wherein said distance detecting means determines the distance between said light emitting element and said imaging means on the basis of the output of said imaging means using a predetermined relationship between the amount of the light from said light emitting element which is received by said imaging means and the distance between said light emitting element and said imaging means.

3. A cursor control device comprising:
   a display device having a display screen on which a cursor is displayed;
   a remote control transmitter including a light emitting element for emitting light rays having a particular wavelength, an operation key for generating an operation signal and means for modulating said light rays by said operation signal, the remote control transmitter providing inputs to remotely control the cursor displayed on the display screen;
   imaging means having a predetermined imaging area for imaging said light rays providing inputs from said light emitting element within the predetermined imaging area;
   distance detecting means for determining the distance between said light emitting element and said imaging means;
   position detecting means for determining the position of said light emitting element on the basis of an output of said imaging means;
   cursor controlling means for determining the amount of movement and the direction of movement of said light emitting element on the basis of the position of said light emitting element which is determined by said position detecting means, for determining the amount of movement of the cursor by multiplying the amount of movement of said light emitting element by a coefficient, and for determining the direction of movement of the cursor on the basis of the direction of movement of the cursor on the basis of the direction of movement of said light emitting element, to control the position of the cursor on the display screen on the basis of the determined amount of movement of the cursor and the determined direction of movement of the cursor;

coefficient controlling means for controlling said coefficient used for calculating the amount of movement of the cursor by said cursor controlling means on the basis of the distance determined by said distance detecting means; and means for outputting an on-off judging signal of the inputs from said operation key by demodulating the output of said imaging means.

4. The cursor control device according to claim 3, wherein said distance detecting means determines the distance between said light emitting element and said imaging means on the basis of the output of said imaging means using a predetermined relationship between the amount of the light from said light emitting element which is received by said imaging means and the distance between said light emitting element and said imaging means.

5. A cursor control device comprising:

a display device having a display screen on which a cursor is displayed;

a remote control transmitter including a light emitting element for emitting light rays having a particular wavelength, an operation key and means for changing the intensity of the light outputted from said light emitting element in two stages in response to an on-off judging signal of said operation key, the remote control transmitter providing inputs to remotely control the cursor displayed on said display screen;

imaging means having a predetermined imaging area for imaging said light rays providing inputs from said light emitting element within the predetermined imaging area;

distance detecting means for determining the distance between said light emitting element and said imaging means;

position detecting means for determining the position of said light emitting element on the basis of an output of said imaging means;

cursor controlling means for determining the amount of movement and the direction of movement of said light emitting element on the basis of the position of said light emitting element which is determined by said position detecting means, for determining the amount of movement of the cursor by multiplying the amount of movement of said light emitting element by a coefficient, and for determining the direction of movement of the cursor on the basis of the direction of movement of said light emitting element, to control the position of the cursor on the display screen on the basis of the determined amount of movement of the cursor and the determined direction of movement of the cursor;

coefficient controlling means for controlling said coefficient used for calculating the amount of movement of the cursor by said cursor controlling means on the basis of the distance determined by said distance detecting means; and means for outputting the on-off judging signal of the inputs from said operation key on the basis of the output of said imaging means.

6. The cursor control device according to claim 5, wherein said distance determining means finds the distance between said light emitting element and said imaging means on the basis of the output of said imaging means using a predetermined relationship between the amount of the light from said light emitting element which is received by said imaging means and the distance between said light emitting element and said imaging means.

* * * * *